(12) United States Patent
Al Sayeed et al.

(10) Patent No.: US 10,826,641 B1
(45) Date of Patent: Nov. 3, 2020

(54) SWAPPING BUNDLES OF OPTICAL CHANNELS IN A C+L BAND SYSTEM BASED ON FREQUENCY BAND SENSITIVITY

(71) Applicant: Ciena Corporation, Hanover, MD (US)

(72) Inventors: Choudhury A. Al Sayeed, Stittsville (CA); Yanping Xu, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/788,453

(22) Filed: Feb. 12, 2020

(51) Int. Cl.
*H04J 14/02* (2006.01)
*H04B 10/079* (2013.01)

(52) U.S. Cl.
CPC ...... *H04J 14/0212* (2013.01); *H04B 10/0793* (2013.01); *H04B 10/07955* (2013.01); *H04J 14/0209* (2013.01); *H04J 14/0221* (2013.01)

(58) Field of Classification Search
CPC .................................................. H04J 14/0227
See application file for complete search history.

(56) References Cited

U.S. PATENT DOCUMENTS

| | | | |
|---|---|---|---|
| 6,885,822 B1 * | 4/2005 | Chin | H04J 14/0227 398/3 |
| 8,509,621 B2 | 8/2013 | Boertjes et al. | |
| 9,252,913 B2 | 2/2016 | Al Sayeed et al. | |
| 9,344,191 B2 | 5/2016 | Al Sayeed et al. | |
| 9,577,763 B2 | 2/2017 | Al Sayeed et al. | |
| 9,768,902 B2 | 9/2017 | Al Sayeed et al. | |
| 9,806,803 B2 | 10/2017 | Bownass et al. | |
| 9,882,634 B1 | 1/2018 | Al Sayeed et al. | |
| 9,906,294 B2 | 2/2018 | Al Sayeed et al. | |
| 9,918,148 B2 | 3/2018 | Swinkels et al. | |
| 9,973,295 B2 | 5/2018 | Al Sayeed et al. | |
| 9,985,726 B1 | 5/2018 | Al Sayeed et al. | |
| 9,986,317 B1 | 5/2018 | Al Sayeed et al. | |
| 10,050,737 B1 | 8/2018 | Al Sayeed et al. | |

(Continued)

OTHER PUBLICATIONS

Ives et al., "Routing, modulation, spectrum and launch power assignment to maximize the traffic throughput of a onolinear optical mesh network", Photon Netw Commun, Springer, 2015 (Year: 2015).*

*Primary Examiner* — Shi K Li
(74) *Attorney, Agent, or Firm* — Clements Bernard Walker; Lawrence A. Baratta, Jr.; Christopher L. Bernard

(57) ABSTRACT

Systems, methods, and non-transitory computer-readable media are provided for performing channel swapping techniques for swapping bundles of optical channels in an optical network, such as a C+L band system, based on frequency band sensitivity. In one embodiment, a method includes swapping a first group of channels or first portion of spectrum in a more-sensitive frequency band with a first set of replacement channels or first portion of replacement spectrum using a first swapping technique. The method also includes swapping a second group of channels or second portion of spectrum in a less-sensitive frequency band with a second set of replacement channels or second portion of replacement spectrum using a second swapping technique that is different from the first swapping technique. The first and second swapping techniques are based at least in part on the number of channels or portion of spectrum that can be swapped at any given time instance.

20 Claims, 23 Drawing Sheets

(56) References Cited

U.S. PATENT DOCUMENTS

| | | |
|---|---|---|
| 10,063,313 B1 | 8/2018 | Al Sayeed et al. |
| 10,439,709 B1 | 10/2019 | Al Sayeed et al. |
| 10,491,324 B2 | 11/2019 | Al Sayeed et al. |
| 10,536,235 B2 | 1/2020 | Al Sayeed et al. |
| 10,547,404 B1 | 1/2020 | Al Sayeed et al. |
| 2008/0267622 A1* | 10/2008 | Loprieno ............... H04L 1/203 398/27 |
| 2019/0253361 A1 | 8/2019 | Mackay et al. |
| 2019/0356407 A1 | 11/2019 | Al Sayeed et al. |

* cited by examiner

SWAPPING BUNDLES OF OPTICAL CHANNELS IN A C+L BAND SYSTEM BASED ON FREQUENCY BAND SENSITIVITY

TECHNICAL FIELD

The present disclosure generally relates to optical networking systems and methods. More particularly, the present disclosure relates to band-sensitive bundling of optical channels in an optical system including C-band and L-band channels at least partially filled with Amplified Spontaneous Emission (ASE) channel holders and data traffic signals and performing channel swapping techniques between ASE and traffic signals based on the band-sensitive bundling.

BACKGROUND

Optical networks include nodes interconnected by optical links containing fiber optic cables, pre-amplifiers, post-amplifiers, and intermediate line amplifiers (where necessary). Various power control techniques are utilized to control optical power through the various amplifiers over the optical links. With advanced coherent modulation, and the like, conventional power control techniques for optimization are slow (i.e., operating on the order of seconds), leading to slow restoration, channel adding, channel deleting, and/or other "capacity changes" or new demands.

A technique to deal with the control of optical power involves the use of so-called channel holders, which can include Amplified Stimulated Emission (ASE) sources, modulated lasers, unmodulated lasers, etc. Channel holders are used in optical links to keep optical spectrum in full-fill loading condition so that any capacity change activity can be digitally handled by switching the channel holders with traffic signals. That is, there may be no need to perform an optimization because any capacity change includes swapping a traffic-bearing channel for a channel holder, or vice versa. The conventional approach of swapping channels, however, is limited. For example, one approach is to swap one channel at a time, which can be inefficient.

While channel holders solve the optimization time problem, there is a need to perform capacity changes, i.e., swapping channel holders for traffic-bearing channels, and vice versa, without causing too much power transition in a line system. Also, there is a need to perform the channel swapping procedures in a manner that is faster than one channel or set of contiguous channels at a time.

Currently, conventional solutions for such channel swapping is only performed for optical system operating in the C-band only. One solution includes a "bundling" approach for C-band-only ASE-loaded systems, which include dividing the number of channels to be swapped into a discrete number of groups or bundles and swapping (or switching) the bundles one bundle at a time. Some approaches on how this bundling can be achieved may include linear contiguous bundling, interleaving bundling, and the like. Although these solutions may be sufficient in an optical system including only C-band channels, there is currently, however, no known solutions for bundling in a C+L band ASE-loaded system.

For example, in a two-bundle system, interleaving bundling may refer to a first bundle having all odd-wavelength channels and a second bundle having all even-wavelength channels, while linear contiguous bundling may refer to bundles having no spectral overlap and each bundle may be a contiguous channel of spectrum. In the present disclosure, the interleaving bundling approach may be considered for illustration and comparison purposes. The interleaving bundling approach suffers from Stimulated Raman Scattering (SRS) penalties, while the contiguous bundling approach also suffers from gain-ripple, tilt, and Spectrum Hole Burning (SHB) issues as well.

The conventional approaches (i.e., available for only single-band solutions) use a bundle count to define how much of the total available spectrum can be swapped out at a given time from ASE channel holders to traffic signals (e.g., using contiguous groups or interleaved groups). The previous solutions consider the available spectrum as a single available band and do not consider the sensitivity within a band (such as C-band) since that relationship is not linear.

Therefore, there is a need in the field of multiple-band (e.g., C+L bands) optical networks to enable procedures for swapping channels, which may require bundling strategies in the multiple-band optical network to account for additional time that may be required for capacity changes and may cause more delay in time critical Layer 0 restoration or traffic recovery processes following a fix in a fiber fault.

BRIEF SUMMARY

The present disclosure is directed to systems, methods, and computer-readable media for performing various channel swapping techniques in an optical network. For example, bundles of optical channels can be swapped in a C+L band optical system based on the sensitivity of each frequency band to capacity changes in the other frequency band. In one implementation, a non-transitory computer-readable medium is configured to store computer logic having instructions. When executed, the instructions cause one or more processing devices to swap a first group of channels or first portion of spectrum on an optical link in a more-sensitive frequency band with a first set of replacement channels or first portion of replacement spectrum using a first swapping technique. The instructions also case the one or more processing devices to swap a second group of channels or second portion of spectrum on the optical link in a less-sensitive frequency band with a second set of replacement channels or second portion of replacement spectrum using a second swapping technique that is different from the first swapping technique. The first and second swapping techniques may be based at least in part on the number of channels or portion of spectrum that can be swapped at any given time instance.

In another implementation, the present disclosure provides a control device comprising a processing device and a memory device configured to store computer logic having instructions. When executed, the instructions are configured to cause the processing device to swap a first group of channels or first portion of spectrum on an optical link in a more-sensitive frequency band with a first set of replacement channels or first portion of replacement spectrum using a first swapping technique and swap a second group of channels or second portion of spectrum on the optical link in a less-sensitive frequency band with a second set of replacement channels or second portion of replacement spectrum using a second swapping technique that is different from the first swapping technique. The first and second swapping techniques may be based at least in part on the number of channels or portion of spectrum that can be swapped at any given time instance.

In yet another implementation, a method comprises the steps of swapping a first group of channels or first portion of spectrum in a more-sensitive frequency band on an optical link with a first set of replacement channels or first portion of replacement spectrum using a first swapping technique, and swapping a second group of channels or second portion of spectrum on the optical link in a less-sensitive frequency band with a second set of replacement channels or second portion of replacement spectrum using a second swapping technique that is different from the first swapping technique, wherein the first and second swapping techniques are based at least in part on the number of channels or portion of spectrum that can be swapped at any given time instance.

BRIEF DESCRIPTION OF THE DRAWINGS

The present disclosure is illustrated and described herein with reference to the various drawings. Like reference numbers are used to denote like components/steps, as appropriate. Unless otherwise noted, components depicted in the drawings are not necessarily drawn to scale.

DETAILED DESCRIPTION

Figure 1:
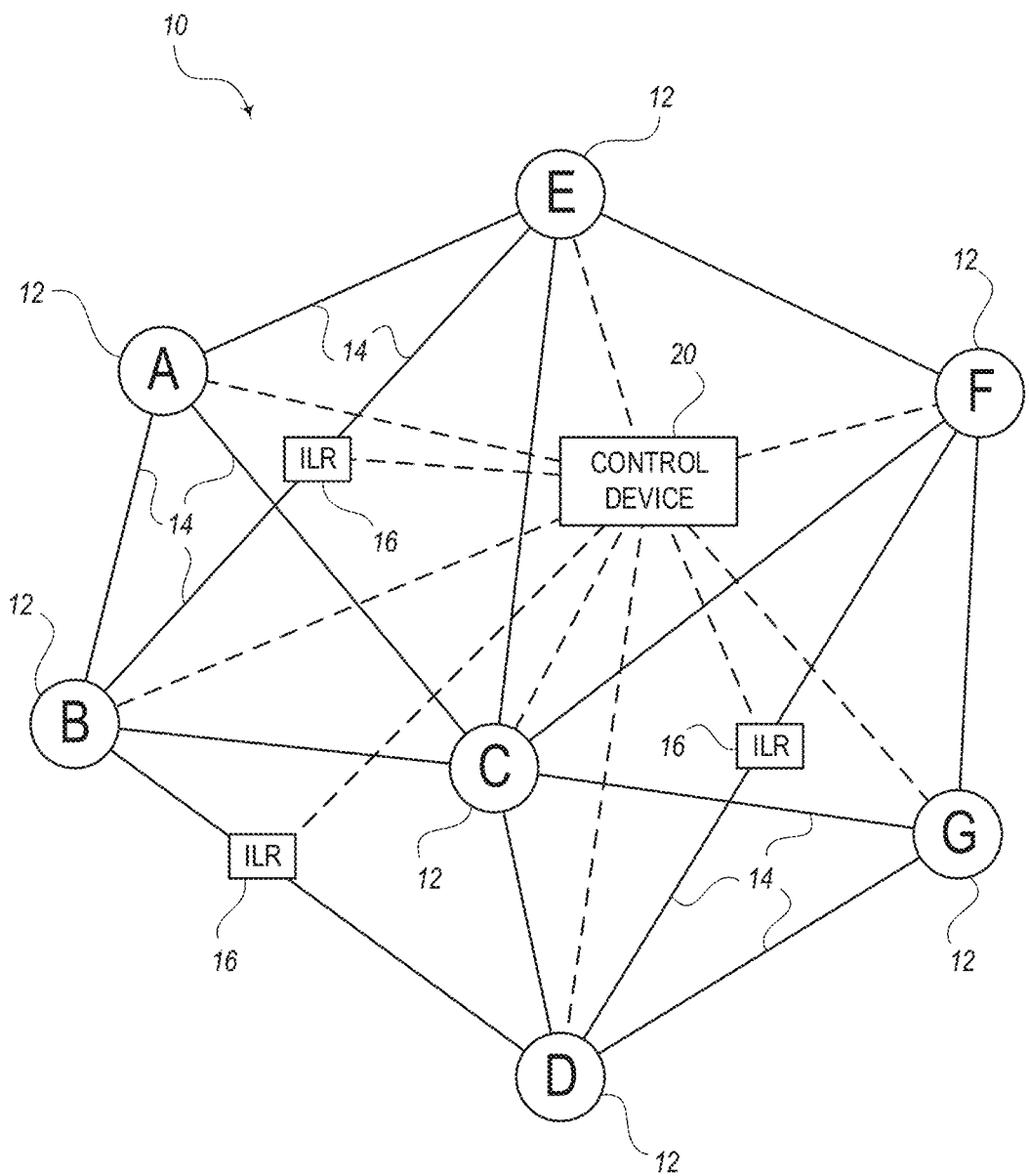
FIG. 1 is a schematic network diagram of an optical network, according to various embodiments of the present disclosure.

The present disclosure relates to systems and methods for swapping or switching between ASE channel holders and traffic channels in a C+L band optical network (i.e., including C-band channels and L-band channels) or other multiple-band optical systems. In particular, the swapping strategies described in the present disclosure may be based on the specific band in which the channels are swapped. For instance, in a C+L band system, swapping channels in the C+L band system may include a bundling technique used in the C-band that is different than a bundling technique used in the L-band. The process of swapping channels may be part of normal capacity changes and/or may follow a fault recovery when spectrum needs to be swapped from ASE channel holders to traffic signals.

Again, the term "bundle" refers to how much spectrum (or how many channels) is swapped, changed, modified, etc. at any given time. As is described herein, ideally, one could change all of the spectrum at a single time. Here, the bundle would refer to the entire spectrum. However, this approach has impact to existing channels. Thus, capacity changes in an optical link are constrained to occur in multiple bundles. Further, the term "channel" is used herein to refer to an optical channel, but those skilled in the art will recognize the term "spectrum" can also be used instead of channel. For example, a channel may refer to a defined channel in a fixed grid optical system whereas spectrum may be used in a flexible grid optical system.

Based on the different frequency bands in a multiple-band optical network, traffic signals in a higher frequency band (e.g., the C-band in the C+L band system) will normally be less sensitive to changes in the lower frequency band (e.g., the L-band in the C+L band system). Thus, the higher frequency band may be considered to be "less sensitive" (i.e., impacted or influenced to a smaller degree) due to any restoration activity, power loss, fiber impact, or other activities in the lower frequency band. On the other hand, the lower frequency band is considered to be "more sensitive" to activities in the higher frequency band. Also, the present disclosure utilizes the C-band and L-band for illustration purposes, and the present disclosure contemplated other bands as well (e.g., S-band, U-band, etc.).

The systems and methods of the present disclosure are configured to perform channel swapping processes in light of the differences in sensitivities in the bands of a multiple-band optical network. One solution, as described in the present disclosure, includes bundling the channels to be swapped in such a way so as to minimize the impact that the action of swapping channels in the higher frequency band has on the lower frequency band. For example, the bundling process for the higher frequency band may include dividing the total number of channels to be swapped into a greater number of bundles, whereby each bundle may include a lower number of channels. Then, the swapping procedure can be enacted one bundle at a time in a stepwise manner. Thus, the more gradual channel swapping in the higher frequency band will allow the more-sensitive lower frequency band to handle these changes.

The swapping processes described in the present disclosure may be needed in response to various conditions or requests. For example, when there are capacity changes at a node (i.e., dropping a traffic channel and replacing it with a channel holder, adding a new traffic channel, etc.), the swapping processes may include receiving a request for such a capacity change and performing the channel swapping one bundle at a time. Also, the swapping processes may be needed due to a fault recovery, where one or more lost traffic channels are replaced by channel holders and replacing the channel holders with the traffic channels when they are restored.

In addition, since the higher frequency band (e.g., C-band) is less sensitive to channel swapping in the lower frequency band (e.g., L-band), capacity change, fault recover, restoration, etc. in the L-band can be performed much faster and does not have to slow down due to traffic presence in C-band. In particular, the channels to be swapped in the L-band can be divided into larger bundles (i.e., having more channels) by separating the total number of channels to be swapped a fewer number of times. Regardless of the lower sensitivity of the higher frequency band, some level of bundling may still need to be applied in the lower frequency band while moving traffic signals into the previously channel-filled ASE channel holder to ensure that the traffic signals in the lower frequency band are not significantly impacted by the changes in its own band.

Capacity changes, restoration, and/or fault recovery in the C-band may need to slow down with higher bundle count (i.e., fewer channels in each bundle) compared to a C-band only system in order to reduce any negative impacts on lower frequency L-band traffic signals. However, for any multiplex section, if no traffic signal is present in the L-band, then restoration in the C-band can be made dynamically faster with a lower bundle count (i.e., more channels in each bundle).

In general, in the C+L band system, bundling in the C-band may be controlled by a section multiplexer channel controller using a C-band specific spectrum selective switching element such as a C-band Wavelength Selective Switch (WSS), and bundling in the L-band may be controlled using an L-band specific spectrum selective switching element, such as an L-band WSS. The L-band WSS may or may not be present in an initial deployment in the C+L band ASE-loaded system. As such, the L-band spectrum may be filled up with L-band ASE channel holder with no traffic presence.

In addition, capacity changes or restoration activity in one band can run in parallel with capacity changes taking place on the other band by selecting bundling sizes for each of the C-band and L-band accordingly. That is, capacity change or restoration activity does not need to be sequenced between two bands, but instead some of the capacity changes in the two bands may occur simultaneously or in an overlapping manner.

In the present disclosure, bundling counts may be presented and simulated in order to minimize SNR penalty impacts and in order to keep SNR loss lower than 1.5 dB during transient switching. If the existing in-service channels have additional margin, the bundling count can be reduced in both the C-band and L-band. For example, if channels in the L-band have more margins (e.g., less than 1.5 dB), then both the C-band and L-band bundle counts can be reduced proportionately to allow more channels to be switched at any time instant.

Similarly, if channels in the L-band have less than 1.5 dB simulated margins, the systems and methods of the present disclosure may take a more cautious approach. For example, the channel swapping control may be applied while changing spectrum in C-band and in L-band such that the bundling count may be increased (i.e., to place fewer channels in each bundle) compared to what might otherwise be presented in the present disclosure. In some embodiments, the bundling count in the C-band and L-band can change based on available margins on pre-existing L-band channels. More margins in this respect may mean a lower bundle count, while less margins may mean a higher bundle count.

There can be several methods for determining the bundling count. For example, the bundling count can be determined based on the worst-case SNR penalty on traffic channels present in the sensitive band for the longest possible reach for any traffic channels. The advantage of doing so is that bundling count does not have to be dynamically adjusted from OMS to OMS by a higher-layer external controller. In a fully ASE loaded system, long-haul vs metro mesh networks will not make much difference in deciding the bundling count other than the overall link budget impact (e.g., SNR margin impact). Similarly, the spectrum location of traffic vs ASE channels during capacity changes does not affect a fully loaded ASE system since the total power into the line system remains unchanged. In general, SNR margin impact for any channel in a line system can be impacted due to distance, fiber types, WSS counts, and/or placement of amplifiers. It can also be impacted due to transmission mode, Baud rate, capacity or modulation format carried by the traffic signal as well. Different fiber types exhibit different SRS characteristics over the fiber transmission medium. For fiber types that exhibit stronger SRS, such as Non-Zero Dispersion-Shifted Fiber (NZDSF), the total launch power to the fiber span can be reduced to minimize SRS impacts over the "sensitive" band(s) in order to maintain similar bundling count compared to fiber types that exhibit less SRS (such as Non-Dispersion-Shifted Fiber (NDSF)). The presence of Raman can also minimize SRS transients from "non-sensitive" to "sensitive" bands. Hence, with the presence of Raman amplification within an Optical Multiplex Section (OMS), the bundle count in the non-sensitive band(s) can be made faster than that of non-Raman configuration.

There has thus been outlined, rather broadly, the features of the present disclosure in order that the detailed description may be better understood, and in order that the present contribution to the art may be better appreciated. There are additional features of the various embodiments that will be described herein. It is to be understood that the present disclosure is not limited to the details of construction and to the arrangements of the components set forth in the following description or illustrated in the drawings. Rather, the embodiments of the present disclosure may be capable of other implementations and configurations and may be practiced or carried out in various ways. Also, it is to be understood that the phraseology and terminology employed are for the purpose of description and should not be regarded as limiting.

As such, those skilled in the art will appreciate that the inventive conception, upon which this disclosure is based, may readily be utilized as a basis for the designing of other structures, methods, and systems for carrying out the several purposes described in the present disclosure. Those skilled in the art will understand that the embodiments may include various equivalent constructions insofar as they do not depart from the spirit and scope of the present invention. Additional aspects and advantages of the present disclosure will be apparent from the following detailed description of exemplary embodiments which are illustrated in the accompanying drawings.

Optical Network

FIG. 1 is a schematic diagram of an embodiment of an exemplary optical network 10. The optical network 10 includes nodes 12 (labelled A, B, C, D, E, F, and G) interconnected to one another via links 14 which physically can include one or more optical fibers. The nodes 12 can also be referred to as network elements and can include, without limitation, Wavelength Division Multiplex (WDM) terminals, Dense WDM (DWDM) terminals, Optical Add/Drop Multiplexers (OADMs), Reconfigurable OADMs (ROADMs), optical cross-connects, optical switches, Packet-Optical Transport Systems (POTS), routers, switches, and the like. In various embodiments, the nodes 12 include various hardware and software to communicate with one another via wavelengths/spectrum as well as optionally digital communication via timeslots, packets, etc. At a physical layer, the nodes 12 provide one or more wavelengths between one another over the links 14. Note, while FIG. 1 shows a single node 12 at each location, there can be multiple devices or network elements providing multiple wavelengths.

As illustrated, the optical network 10 has a mesh architecture. Each of the links 14 may be an Optical Multiplex Section (OMS) section and may include various amplifiers including pre-amplifiers and post-amplifiers, which are omitted in FIG. 1 for illustration purposes. Some of the links may include Intermediate Line Repeaters (ILRs) amplifiers 16 as needed. OMS deals with fixed wavelength DWDM (Dense Wavelength Division Multiplexing) between OADMs (Optical Add Drop Multiplexer). Of note, the OMS sections can have different fill levels in terms of occupied channels or spectrum, which is the purpose of channel holders—to present a full-fill loading condition. For example, a wavelength #1 can be routed from node A to node G via the node C and a wavelength #2 can be routed from node A to node D via the node C. Thus, the wavelengths #1, #2 share the link 14 between nodes A and C. As one of ordinary skill can appreciate, various other wavelengths can also be equipped such that the links 14 can have various different fill levels. Further, the wavelengths #1, #2 traverse an intermediate OADM at the node C, thus this is said to be a cascaded optical network as different wavelengths can traverse multiple OMS sections (i.e., links 14).

The optical network 10 can also include one or more servers and/or a control plane. A control device 20 may operate in the control plane for controlling operating aspects of the nodes 12 and/or ILRs 16. In some embodiments, the control device 20 may be configured as one or more servers in the optical network 10. The servers can include or operate as, for example, a Software Defined Networking (SDN) controller, an SDN application, a Network Management System (NMS), an Element Management System (EMS), a planning tool, a Path Computation Element (PCE), etc. The control plane provides an automated allocation of network resources in an end-to-end manner. Examples of control planes may include Automatically Switched Optical Network (ASON) as defined in ITU-T G.8080/Y.1304 (the contents of which may be incorporated by reference herein), a Generalized Multi-Protocol Label Switching (GMPLS) architecture as defined in IETF Request for Comments (RFC) (the contents of which may be incorporated by reference herein), and/or other suitable control planes for establishing connections and controlling network elements at multiple layers. The control device 20, operating in the control plane, may be configured to establish end-to-end signaled connections to route channels and program the underlying hardware accordingly. SDN provides the management of network services through abstraction of lower-level functionality. This is done by decoupling the system that makes decisions about where traffic is sent (the control plane) from the underlying systems that forward traffic to the selected destination (the data plane).

Control Device

Figure 2:
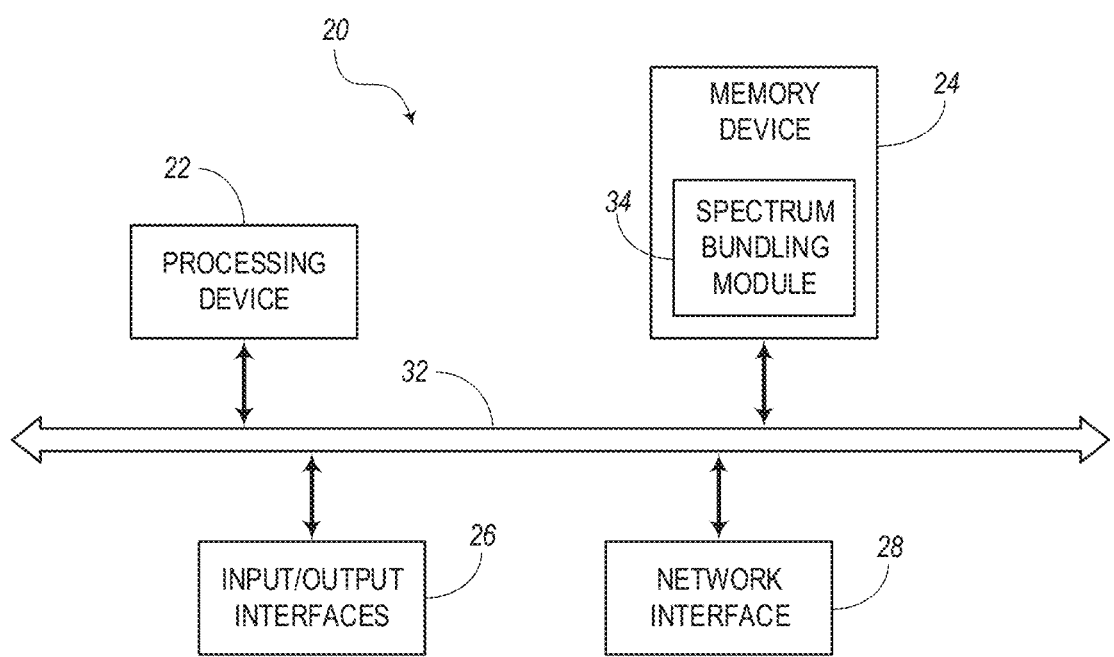
FIG. 2 is a block diagram of the control device shown in the optical network of FIG. 1, according to various embodiments.

FIG. 2 is a block diagram illustrating an embodiment of the control device 20 shown in FIG. 1 for controlling various network elements within the optical network 10 of FIG. 1. In the illustrated embodiment, the control device 20 may be a digital computer that, in terms of hardware architecture, generally includes a processing device 22, a memory device 24, input/output (I/O) interfaces 26, and a network interface 28. The memory device 24 may include a data store, database, or the like. It should be appreciated by those of ordinary skill in the art that FIG. 2 depicts the control device 20 in a simplified manner, where practical embodiments may include additional components and suitably configured processing logic to support known or conventional operating features that are not described in detail herein.

The control device 20 may further include a spectrum bundling module 34, which may be implemented in hardware, software, and/or firmware. As shown in FIG. 2, the spectrum bundling module 34 may be stored as software in a non-transitory computer-readable medium (e.g., the memory device 24) and may include instructions which, when executed, cause the processing device 22 to perform various functions for bundling channels or portions of a spectrum during a fault recovery process or when there are capacity changes in the optical network 10. According to various embodiments, the term "bundling" may refer to the number of channels that can be added or removed at the same time or how much spectrum (e.g., how many channels) can be changed or switched for a given snapshot at a given time. Although it may be desirable to perform these bundling steps all at once, the various implementations of the present disclosure may be configured to perform the channel bundling steps in a number of sequential steps. Details of the spectrum bundling module 34 are described in more detail below.

Regarding the control device 20, the components (i.e., 22, 24, 26, 28) may be communicatively coupled via a local interface 32. The local interface 32 may be, for example, but not limited to, one or more buses or other wired or wireless connections. The local interface 32 may have additional elements, which are omitted for simplicity, such as controllers, buffers, caches, drivers, repeaters, receivers, among other elements, to enable communications. Further, the local interface 32 may include address, control, and/or data connections to enable appropriate communications among the components 22, 24, 26, 28.

The processing device 22 is a hardware device adapted for at least executing software instructions. The processing device 22 may be any custom made or commercially available processor, a central processing unit (CPU), an auxiliary processor among several processors associated with the control device 20, a semiconductor-based microprocessor (in the form of a microchip or chip set), or generally any device for executing software instructions. When the control device 20 is in operation, the processing device 22 may be configured to execute software stored within the memory device 24, to communicate data to and from the memory device 24, and to generally control operations of the control device 20 pursuant to the software instructions.

It will be appreciated that some embodiments of the processing device 22 described herein may include one or more generic or specialized processors (e.g., microprocessors, Central Processing Units (CPUs), Digital Signal Processors (DSPs), Network Processors (NPs), Network Processing Units (NPUs), Graphics Processing Units (GPUs), Field Programmable Gate Arrays (FPGAs), and the like). The processing device 22 may also include unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry" or "logic" that is "configured to" or "adapted to" perform a set of operations, steps, methods, processes, algorithms, functions, techniques, etc., on digital and/or analog signals as described herein for the various embodiments.

The I/O interfaces 26 may be used to receive user input from and/or for providing system output to one or more devices or components. User input may be provided via, for example, a keyboard, touchpad, a mouse, and/or other input receiving devices. The system output may be provided via a display device, monitor, graphical user interface (GUI), a printer, and/or other user output devices. I/O interfaces 26 may include, for example, a serial port, a parallel port, a small computer system interface (SCSI), a serial ATA (SATA), a fiber channel, InfiniBand, iSCSI, a PCI Express interface (PCI-x), an infrared (IR) interface, a radio frequency (RF) interface, and/or a universal serial bus (USB) interface.

The network interface 28 may be used to enable the control device 20 to communicate over a network, such as the optical network 10, the Internet, a wide area network (WAN), a local area network (LAN), and the like. The network interface 28 may include, for example, an Ethernet card or adapter (e.g., 10BaseT, Fast Ethernet, Gigabit Ethernet, 10 GbE) or a wireless local area network (WLAN) card or adapter (e.g., 802.11a/b/g/n/ac). The network interface 28 may include address, control, and/or data connections to enable appropriate communications on the optical network 10.

The memory device 24 may include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the memory device 24 may incorporate electronic, magnetic, optical, and/or other types of storage media. The memory device 24 may have a distributed architecture, where various components are situated remotely from one another, but can be accessed by the processing device 22. The software in memory device 24 may include one or more software programs (e.g., the spectrum bundling module 34), each of which may include an ordered listing of executable instructions for implementing logical functions. The software in the memory device 24 may also include a suitable operating system (O/S) and one or more computer programs. The operating system (O/S) essentially controls the execution of other computer programs, and provides scheduling, input-output control, file and data management, memory management, and communication control and related services. The computer programs may be configured to implement the various processes, algorithms, methods, techniques, etc. described herein.

The memory device 24 may include a data store used to store data. In one example, the data store may be located internal to the control device 20 and may include, for example, an internal hard drive connected to the local interface 32 in the control device 20. Additionally, in another embodiment, the data store may be located external to the control device 20 and may include, for example, an external hard drive connected to the I/O interfaces 26 (e.g., SCSI or USB connection). In a further embodiment, the data store may be connected to the control device 20 through a network and may include, for example, a network attached file server.

Moreover, some embodiments may include a non-transitory computer-readable storage medium having computer readable code stored in the memory device 24 for programming the control device 20 or other processor-equipped computer, server, appliance, device, circuit, etc., to perform functions as described herein. Examples of such non-transitory computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by the processing device 22 that, in response to such execution, cause the processing device 22 to perform a set of operations, steps, methods, processes, algorithms, functions, techniques, etc. as described herein for the various embodiments.

Figure 3:
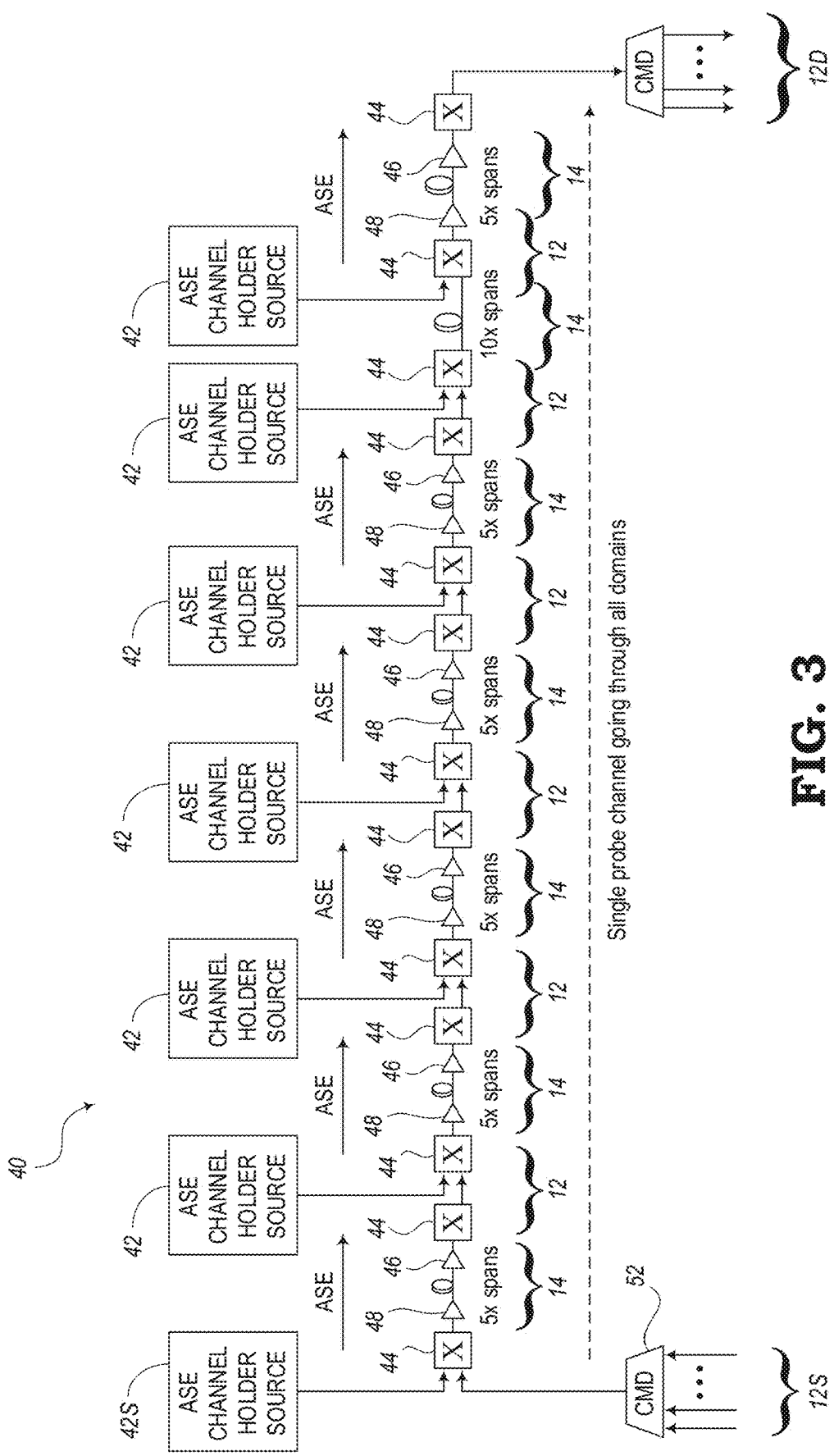
FIG. 3 is a schematic diagram illustrating a portion of the optical network, according to various embodiments.

FIG. 3 is a schematic diagram of a portion 40 of an optical network (e.g., a portion of the optical network 10 of FIG. 1), where the portion 40 further includes additional details for optical communication between two nodes (e.g., nodes 12). It should be noted that FIG. 3 includes a number of nodes 12 (required for communication from one node to another) that is larger than the number of nodes 12 required for communication as shown in FIG. 1. In FIG. 3, a source node 12S communicates to a destination node 12D via multiple (e.g., six) other intermediate nodes 12. Although communication is shown as being in one direction (i.e., from source node 12S to destination node 12D) for illustration purposes, it should be noted that communication may be bidirectional.

In FIG. 3, the portion 40 of the optical network may further include an Amplified Spontaneous Emission (ASE) channel holder source 42 at each of the nodes, including an ASE channel holder source 42S at the source node 12S. For illustration purposes, the portion 40 is shown in a unidirectional configuration from the node 12S to the node 12D with intermediate nodes 12. Those of ordinary skill in the art will appreciate that the portion 40 may include an implementation in which complementary equipment may be included in the opposite direction to form bidirectional connectivity. The nodes 12 may each include Wavelength Selective Switches (WSSs) 44 for each degree of the respective node 12, pre-amplifiers 46, and post-amplifiers 48. Some of the links 14 may include line amplifiers, ILRs (e.g., ILRs 16), etc. Note, the WSS 44 can generally be defined as an OADM device/OADM multiplexer circuit pack or other degree forming components. For illustration purposes, a traffic signal 50 is shown between the source node 12S and the destination node 12D, whereby the traffic signal 50 may be added/dropped via a multiplexer/demultiplexer 52 at the source node 12S and added/dropped via a multiplexer/demultiplexer 54 at the destination node 12D.

The ASE channel holder sources 42 may be configured to inject one or more channels at each WSS 44 in the multiplexer direction to replicate a channel's signal spectral shape, such that unoccupied or faulted channels can be present on the links 14 for optical power purposes. In some embodiments, the channel holder sources 42 can be ASE-based, modulated, unmodulated, etc. An objective is to fill in the spectrum on the links 14 initially so that each OMS section remains full-fill regardless of how many traffic channels are actually equipped. For example, the channel holder sources 42 can be injected locally to fill empty spectrum space, where there is no traffic signal present. When a traffic signal is provisioned or appears from an upstream node 12, the spectrum space is switched from the channel holder source 42 to the traffic switch port to make adequate spectral space for the traffic signal.

With the spectrum at full-fill and the channel holder sources 42 being launched at the same power level as the traffic signals, the total power within each OMS link 14 remains constant; overcapacity changes that keep SRS, ripple, tilt, Spectral Hole Burning (SHB) impact on the OMS link 14 the same in the steady-state. The long chain of amplifiers 46, 48 can be either gain controlled or Total Output Power (TOP) controlled in their respective OMS link 14. That is, on one OMS link 14, the amplifiers 46, 48 can be gain-controlled, whereas, in the next OMS link 14, the amplifiers 46, 48 can be TOP controlled.

The control device 20 can be communicatively coupled to the OADM nodes 12 and the intermediate optical line amplifiers (e.g., ILRs 16). In one embodiment, the control device 20 can be "in-skin" where it is part of one or more of the OADM nodes 12, i.e., a module contained therein. In another embodiment, the control device 20 can be an external device that is in communication with the various nodes. In either embodiment, the control device 20 is generally a processing device that obtains inputs from the optical network 10 and provides outputs for configuring the optical network 10. The control device 20 can perform a control algorithm/loop for managing wavelengths/spectrum from a physical perspective at Layer 0. In one aspect, the control device 20 is configured to add/remove wavelengths/spectrum from the spans in a controlled manner to minimize impacts to existing, in-service, traffic-carrying channels. For example, the control device 20 can adjust modem launch powers, optical amplifier gain, Variable Optical Attenuator (VOA) settings, WSS parameters, etc.

The simulation setup of the portion 40 of the optical network of FIG. 3 includes 40 fiber spans. The portion 40 may include eight Optical Multiplex Sections (OMSs) with five spans per OMS. OMS in the exemplary simulation is referred as an optical domain (DOM). In one configuration, the amplified spans may include Erbium-Doped Fiber Amplifiers (EDFA) only, where each span is about 80 km. In another configuration, the amplified spans may include EDFA plus Raman amplifiers for each span, where each span is about 80 km.

According to various test cases of the portion 40, a first test case includes a single 75 GHz probe channel swept from low frequency to high frequency spectral locations for maximal capacity changes. An initial state (State 1) may include a full-filled spectrum with single probe channel and channelized carved ASE holders going through all the 40x spans. A transient state (State 2) may include a percentage of interleaving spectrum removed along all the domains. The single probe channel going remains. This test case may be used to emulate the portion 40, where head-end OADM multiplexer will switch from ASE to a traffic signal using a bundling approach, where all the other downstream OADM multiplexers are already done with their swap.

With respect to a performance matrix, an estimate of an end of section SNR delta between State 1 and State 2 may be calculated by combining both linear and nonlinear penalties due to transient swaps. The performance matrix may further be defined by estimating the estimate end of section power spectral density penalty for the probe channel between State 1 and State 2. Also, the performance matrix can also be defined by estimating the end of section optical SNR penalty (linear penalty) for the probe channel between State 1 and State 2.

For C+L, a total spectrum of about 9.6 THz may be used for bundling. In this case, a maximum of 12 bundles would be needed to swap out all 9.6 THz of spectrum from ASE to traffic. Thus, it may be determined whether or not a restoration or channel add/delete in the L-band or the C-band would be needed, which will be limited by the 12 bundles. In this situation, roughly one minute would be needed for restoration time (e.g., four seconds/bundle*12 bundles plus about 8 seconds of overhead).

If band-sensitive bundling were considered and if a maximum of twelve bundles are applied for the C-band and a maximum of four bundles are applied in the L-band, then the following may apply. First, a capacity change or restoration in the L-band can be done much faster and does not have to slow down due to the presence of the C-band. Restoration in the L-band can be completed roughly in 4 bundles. Also, restoration in the C-band will still have to slow down in order to reduce impact on the lower frequency L-band traffic. There may be maximum bundle size of 12 in this case. If no L-band traffic if present for any section, then restoration in the C-band can be made faster with smaller bundle sizes (e.g., four bundles). Furthermore, the presence of Raman helps to reduce SNR penalties on the line system.

Capacity change in the C-band (e.g., with a maximum bundle size of 12) and in the L-band (e.g., with a maximum bundle size of 4) can take place in parallel without any sequencing activity between each other.

Capacity Change with Channel Holders

Thus, on channel-holder-based optical links 14, ASE-based channels are injected at each backbone OADM location at the mux direction, where ASE is carved to replicate the spectral shape of the traffic signal 50. For capacity changes, power on specific spectral locations are swapped out between channelized ASE and traffic signals, i.e., for an add, ASE channels will be taken out and replaced with traffic signals and vice versa for delete. For large capacity changes (for high channel count add or deletes), if all ASE channels are swapped out in one shot, then the remaining in-service channels on the link will experience a large transient power offset due to SRS, amplifier ripple and tilt changes and in some cases due to Spectral Hole Burning (SHB) impacts. This will cause in-service channels to experience a momentary traffic hit depending on their available margin to tolerate the switching transient. Such transient impacts defeat the whole purpose of deploying channel holders in every mux locations in the first place that is supposed to make capacity changes hitless to in-service channels.

To improve the speed of capacity changes, there is a requirement for some level of bundling. This means, instead of swapping all ASE holders in one shot or one at a time, the ASE channel holders are swapped out in multiple bundles, i.e., few at a time, to introduce traffic signals at those locations and then move to the next bundle. This bundling approach is required to reduce any power offsets, and Signal-to-Noise Ratio (SNR) margin impacts on pre-existing in-service channels due to SRS, amplifier ripple and dynamic tilt changes, and SHB impacts that take place power on specific spectral locations are taken out from the full-fill channel holder based optical links.

This disclosure specifically focuses on developing a bundling approach for channel holder based optical links with an objective to provide low transient impacts during capacity changes, to keep the capacity change time low irrespective of OADM hop counts, and without any communication between adjacent optical section controllers to notify each other for any sequential actions. More precisely, the disclosure proposes an interleaving bundling approach to swap out ASE holders in interleaving logical spectral boundaries (slots) in different bundles that primarily experience the impact of SRS due to changes in total power to fiber in each bundle, but drastically minimizes the dynamic impact of amplifier tilt changes, and hole burning impacts during capacity changes. The approach can allow aggressive bundling for channel holder based optical links to minimize capacity change times, where each OMS controller can apply bundling on its own without any notification between peers.

In the optical network 10 of FIG. 1 (or portion 40 of FIG. 3), it is assumed, relative to capacity changes, that there is no communication or sequencing between optical sections. The communication infrastructure simply may not be available due to customer preference, or because the OMS is running equipment from different vendors, or the like. That means, when the capacity change request will come into each OADM node 12, a local controller in each OADM node 12 will apply its own set of bundling (no coordination with upstream or downstream controllers). The local controller can check if channel power is available on its input monitoring point before making a switch. The local controller would not be able to differentiate if the power visible from upstream is coming from ASE holders or from real traffic signals.

Hence, in most cases for capacity changes, what happens is all downstream OADM nodes 12 switch to upstream ASE holders applying their own bundling, while the ingress mux will wait for the Tx to be tuned, and when the power shows up from Tx, the ingress mux will switch applying its own bundling. That means, a bundling algorithm has to be designed such that the end-to-end transient impact remains low for the maximum traversed path distance, while the ingress mux does the switch. The capacity change timing to complete the ASE swap for all adding/deleting channels remains fast (in seconds preferably, and not in minutes, regardless of hop counts).

This disclosure specifically focuses on developing a bundling approach for channel holder based optical links that provides low transient impacts and keeps the capacity change time low irrespective of hop counts and without any communication between optical sections to sequence the channel actions.

Bundling and Channel Swapping Processes

Figure 4:
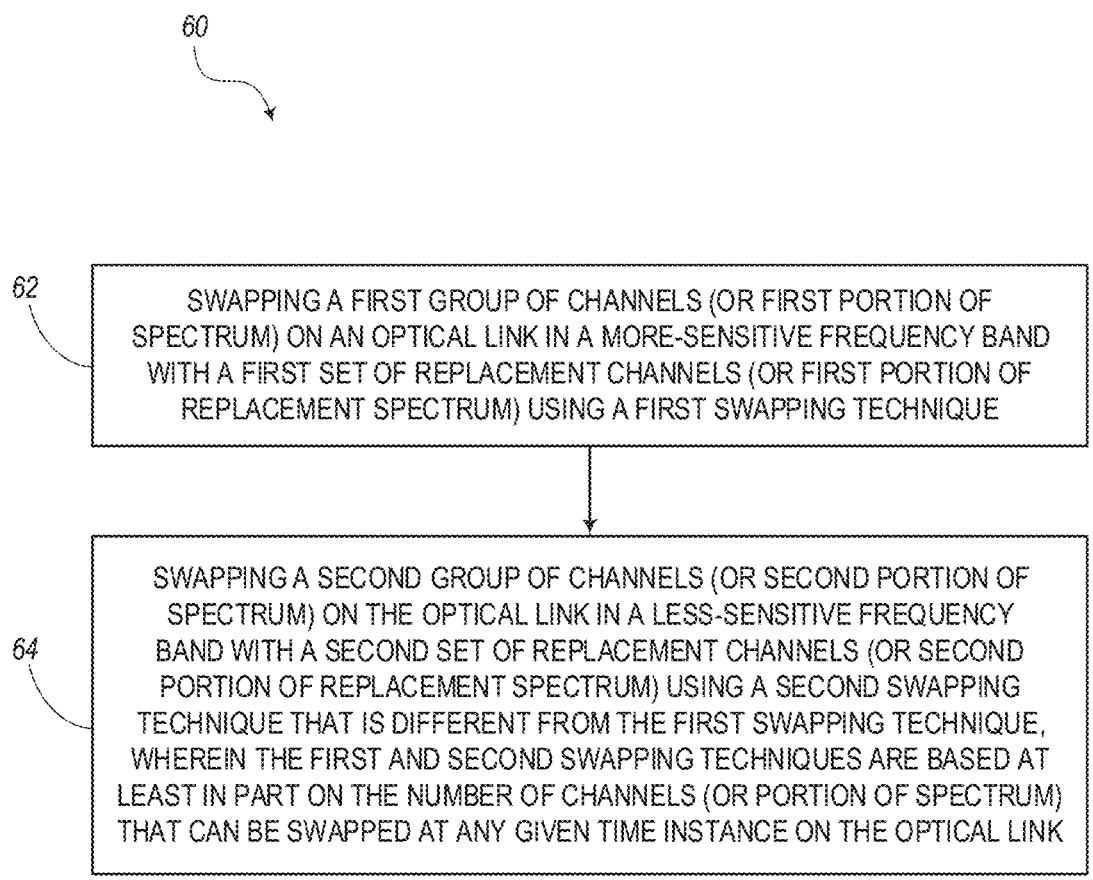
FIG. 4 is a flow diagram illustrating a method for performing a channel swapping procedure, according to various embodiments.

FIG. 4 is a flow diagram of an embodiment of a method 60 for bundling spectrum or channels during a fault recovery process or when capacity changes in an ASE-loaded system. In particular, the method 60 includes bundling for a C+L band system. As mentioned above, the term "bundling" may refer to how many channels a system can add/remove at the same time or how much spectrum (e.g., how many channels) can be changed or switched for a given snapshot at a given time. The method 60 may be configured to perform the channel bundling steps in a number of sequential steps.

The method 60 includes the step of swapping a first group of channels (or first portion of spectrum) on an optical link in a more-sensitive frequency band with a first set of replacement channels (or first portion of replacement spectrum) using a first swapping technique, as indicated in block 62. The method 60 further includes swapping a second group of channels (or second portion of spectrum) on the optical link in a less-sensitive frequency band with a second set of replacement channels (or second portion of replacement spectrum) using a second swapping technique that is different from the first swapping technique, as indicated in block 64. The first and second swapping techniques are based at least in part on the number of channels (or portion of spectrum) that can be swapped at any given time instance on the optical link.

In some embodiments, other bundling and channel swapping methods may be performed via the control device 20 and/or local controllers on each OADM node to replace channel holders with traffic signals on an optical section. As described herein, a bundle represents a number of channels that are to be added to the optical section. One objective of a bundling process may be to add the channels by replacing channel holders in a parallel manner, i.e., not sequentially, to speed up the process such that a capacity change requires N bundles (N>1) which is much less than sequential changes. Of note, the bundling process is described with reference to adding channels (traffic signals) by replacing channel holders (ASE). The same process could be used to remove channels by replacing the traffic signals with channel holders. Each optical section (i.e., an OMS) has usable optical spectrum such as the C-band (e.g., 1528 nm-1565 nm), the L-band (e.g., 1565 nm-1625 nm), etc.

The bundling process includes, responsive to a request for capacity change of X channels on an optical section, where X is an integer>1, and at an Optical Add/Drop Multiplexer (OADM) node in an optical network, dividing optical spectrum on the optical section into M slots, M is an integer>1, such that the capacity change of X channels takes a maximum of N steps, N is an integer>1, and performing the capacity change of X channels in up to the N steps in an interleaved manner that changes a subset of the X channels in each of the N steps.

The bundling process generally utilizes an interleaving approach where the usable optical spectrum is divided into a finite number of logical spectrum slots denoted as M which is a positive integer (e.g., M>1), for which a maximum of N bundles needs to be applied to complete all of the requested capacity changes. For each step, the performing includes a maximum of M/N slots of the M slots with spacing between each of the M/N slots not used for the capacity change in a corresponding step. The spacing can be f, (N+f), (2N+f), M over the optical spectrum, where f is each step, f=1, 2, . . . , N. Here, the numbers represent the slots. The value M is the number of slots for dividing the optical spectrum. Values of M may include 12, 24, 48, 64, 96, etc. The value of N can be referred to as a bundling factor or ratio which determines how to break up the M slots to achieve a given capacity change within N steps.

The capacity change includes any of adding channels by replacing channel holders and removing channels by adding channel holders. In an embodiment, a capacity change can be a mix of adding and removing channels. Of course, the capacity change can also be solely adding or solely removing channels.

The bundling spectral slots or spectral boundaries can be arbitrarily selected, and the slots do not have to be of equal bandwidth, i.e., one or more slots can have higher bandwidth than others. In other words, the spectral slots' width can be dynamically adjusted based on the requested capacity change getting handled on that bundle.

For a given step, as long as a channel signal's bandwidth falls partially or fully within a given spectral slot, it will be swapped out by the process 50 on that bundle/step. Also, it is possible to apply a 50% occupation rule to define which bundle takes care of the requested traffic signal swap for partial occupation. For capacity deletes, the deleting traffic signals are swapped out with channel holders following the same interleaving bundling. If a capacity change is not requested for a spectral slot, the channel holders on that slot remain uninterrupted during interleaving bundling mechanism.

The key point of the bundling is the interleaving spectral swap in each bundle/step. By applying the interleaving bundling, the process 50 effectively removes the impact of gain tilt, ripple, and Spectral Hole Burning (SHB) from capacity changes and only deals with the impact of SRS on a link by controlling the bundling ratio N for a given capacity change. The bundling spectral slots can be adjacent to each other or can have a partial overlapping bandwidth If the requested capacity change ratio at any given time is below a certain percentage of the total usable spectrum such as Z, where for example, $Z \leq 8\%$, the bundling factor N can be set to 1, i.e., all requested spectral slots can be swapped out in one bundle. The bundling process 50 for capacity adds is applied by each OADM node, when power is known to be available from upstream on its locally monitored points, without any communication or notification from upstream OMS controllers to sequence channel actions.

Those skilled in the pertinent art will appreciate that various embodiments may be described in terms of logical blocks, modules, circuits, algorithms, steps, and sequences of actions, which may be performed or otherwise controlled with a general purpose processor, a DSP, an application specific integrated circuit (ASIC), a field programmable gate array, programmable logic devices, discrete gates, transistor logic, discrete hardware components, elements associated with a computing device, or any suitable combination thereof designed to perform or otherwise control the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Further, those skilled in the pertinent art will appreciate that the various illustrative logical blocks, modules, circuits, algorithms, and steps described in connection with the embodiments described in the present disclosure may be implemented as electronic hardware, computer software, or any suitable combinations thereof. To clearly illustrate this interchangeability of hardware and software, various illustrative components, blocks, modules, circuits, algorithms, and steps have been described herein in terms of their general functionality. Whether such functionality is implemented in hardware or software depends upon the particular application and design constraints, and those skilled in the pertinent art may implement the described functionality in various ways to suit each particular application, but such implementation decisions should not be interpreted as causing a departure from the scope or spirit of the present disclosure. Additionally, the various logical blocks, modules, circuits, algorithms, steps, and sequences of actions described herein can be considered to be embodied entirely within any form of computer readable storage medium having stored therein a corresponding set of computer instructions that upon execution would cause an associated processor to perform the functionality described herein. Thus, the various aspects and embodiments disclosed herein may be embodied in a number of different forms, all of which have been contemplated to be within the scope or spirit of the claimed subject matter. In addition, for each of the embodiments described herein, the corresponding form of any such embodiments may be described herein as, for example, "logic configured to" perform the described action.

The methods, sequences and/or algorithms described in connection with the embodiments disclosed herein may be embodied directly in hardware, in a software module executed by a processor, or any suitable combination thereof. Software modules may reside in memory controllers, DDR memory, RAM, flash memory, ROM, electrically programmable ROM memory (EPROM), electrically erase programmable ROM (EEPROM), registers, hard disks, removable disks, CD-ROMs, or any other storage medium known in the art or storage medium that may be developed in the future. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal or other computing device. In the alternative, the processor and the storage medium may reside as discrete components in a user terminal or other computing device.

In one or more exemplary embodiments, the control functions described may be implemented in hardware, software, firmware, or any combination thereof. If implemented in software, the functions may be stored on or transmitted over as one or more instructions or code on a computer-readable medium. Computer-readable media includes both storage media and communication media, including any medium that facilitates transferring a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage, or other magnetic storage devices or media that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The present disclosure focuses on spectrum bundling for capacity changes (channel add/delete) or from recovery from faults in a C+L band ASE-loaded system. In such a system, channelized ASEs are loaded both in C-band and in L-band in order to have a full-fill or partial-fill spectral-loaded system.

In an ASE-loaded system, for any capacity changes, spectrums are digitally switched between channelized ASE and traffic channels. When spectrums are switched from ASE to traffic, if too much traffic is swapped out in one transaction, then total power to the fiber may change, which may introduce power offsets and Signal-to-Noise Ratio (SNR) penalties to pre-existing in-service channels. These penalties may take place due to changes in Stimulated Raman Scattering (SRS), gain-tilt, and gain-ripple, and in some cases due to impacts from Spectral Hole Burning (SHB) over the line system. In order to minimize a SNR penalty on pre-existing traffic channels, only a small percentage of spectrum is switched at a time, which may be referred to as a "bundling" technique.

In an ASE-loaded system, previous bundling methods may be used for C-band systems only. However, the present disclosure specifically focuses on bundling approaches for C+L band ASE-loaded systems, where the available spectrum width has effectively become doubled compared to a system utilizing only the C-band. Based on previous C-band bundling techniques, one approach may involve increasing a bundle count for a wider bandwidth C+L system to keep the penalties low in C-band and L-band spectrum. However, an increasing bundle count will simply slow down overall capacity changes, fault recovery, and Layer 0 restoration activity for both the C-band and L-band traffic channels.

It has been noted that, in a C+L band system, the sensitivity in spectrum changes in the two bands is not the same. It is noted that in a higher frequency band (e.g., a C-band in a C+L system), the higher frequency channels are affected to a smaller degree (i.e., less sensitive) by perturbations in a lower frequency band (e.g., an L-band in the C+L band system). The reason that the higher frequency band is less sensitive to changes in the lower frequency band is that, when spectrums are removed in the lower frequency band (e.g., L-band) as part of an ASE swap, a small amount of power is depleted from the higher frequency band (e.g., C-band channels). That is, the effect of SRS is reduced on the higher C-band. On the other hand, the lower frequency band (e.g., L-band) is affected to a larger degree (i.e., more sensitive) to changes in the higher frequency (e.g., C-band) spectrum, or even due to activities within the L-band spectrum itself.

The embodiments of the present disclosure are configured to compensate for the varying sensitivities between two bands by applying different bundling approaches for the two bands. For example, in a C+L band system, the systems and methods may apply a more aggressive approach in spectrum switching for bundling in the L-band, while applying a more conservative approach for bundling in the C-band. This allows the bundling to be performed in such a way so as to achieve faster Layer 0 restoration activity or fault recovery in the L-band, while slowing down the activity in the C-band compared to a C-band only system. Changing the rate of restoration and/or fault recovery for the different bands may be done in order to keep SNR penalties low on L-band traffic.

In a C-band only ASE-loaded system, spectrum is filled with ASE based channel holders in a desired spectral loading condition (full-fill or partial-fill). For new capacity adds, ASE-based channel holders are replaced with new traffic channels. For deletes, traffic channels are switched back to ASE holders. When a channel goes to Loss of Signal (LOS) in an ASE-loaded system, the channel's spectral space is also replaced with ASE until the channel fault clears.

While switching back and forth between ASE and traffic, bundling is applied for making capacity changes to minimize transients along a channel path on other in-service channels. That is, instead of making all requested capacity changes in one shot, a small percentage of spectrum (or small number of signals) are swapped at a time. In a full-fill system, at spectral switching, the power offsets and SNR impacts comes from change in total power going into the fiber that changes the Stimulated Raman Scattering (SRS), and gain-tilt impacts for other channels. The offset is removed when the switching completes, hence causing a transient impact for pre-existing channels.

Similar bundling rules are applied for channel recovery mechanism in order to minimize transient impacts on other in-service channels. Such transients may be limited by WSS switching events that can lasts for about one to two seconds.

Bundling and Swapping in C+L Band Network

In a typical C-band only ASE-loaded system, a minimum of four (4×) bundles may be applied to switch away full spectrum (~4.8 THz) from ASE to traffic. That is, not more than 25% of total allocated spectrum is switched at a time at a given section mux location in order to keep transient SNR penalty low for any other in-service channels (e.g. <=1.5 dB SNR penalty impact over 40× spans (~3200 km NDSF)). In a C+L ASE-loaded system, spectrum allocation for traffic may essentially be doubled (~9.6 THz).

If the same percentage rule is maintained similar to C-band (e.g., 25%) that will switch double amount of spectrum at a time (compared to C-band only system), and hence, the transient impact for in-service channels will increase. Hence, in order to keep the maximum spectrum switching allocation constant, the bundle size at a minimum can be doubled. For example, with a bundle size of at least eight for maximum switching, the spectrum per bundle may be ≤about 12.5%.

However, in a C+L band system, due to a wider spectrum, the impact of SRS is much stronger, which means that in order to keep the transient switching penalty within a certain limit (e.g., ≤1.5 dB SNR penalty impact), the bundling size is increased to about 12 or more. This means that in the present embodiments, each section mux may take much a longer time (e.g., at least about three times longer) to complete their capacity changes in a C+L system compared to C-band only system. Also, the Layer 0 restoration time may also increase, as well as the channel recovery time following a clearance of a fiber fault.

Figure 5A:
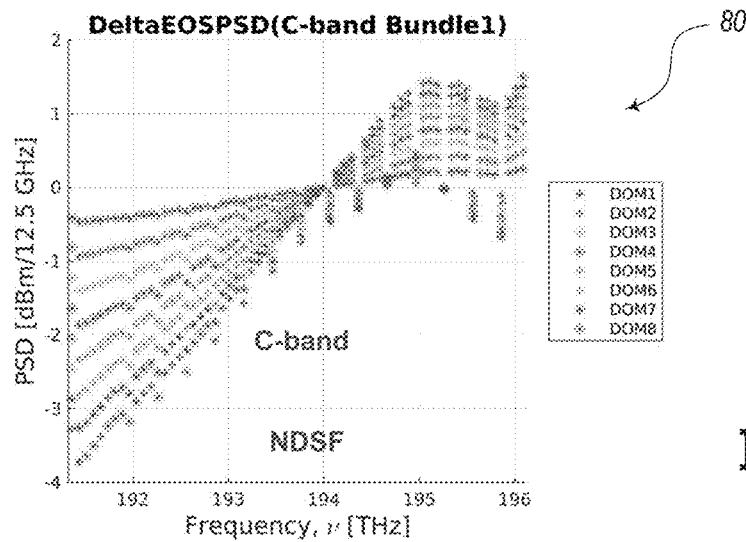
FIGS. 5a-5c are graphs illustrating the bundling impact on a conventional C-band-only ASE-loaded system.
Figure 5B:
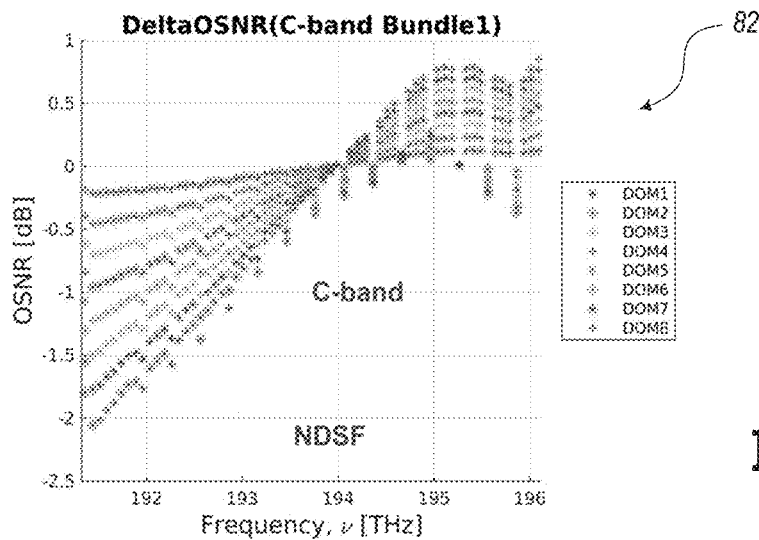
Figure 5C:
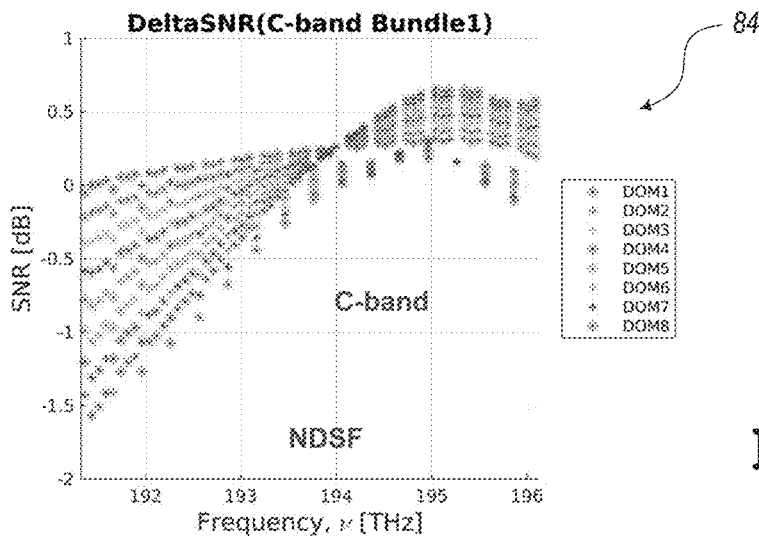

FIGS. 5a-5c are graphs 80, 82, 84, respectively, showing the bundling impact on a conventional C-band only ASE-loaded system. In this example, the C-band only ASE-loaded system is configured for removing 25% of total spectrum in a bundle in an interleaved fashion over a 40×80 km span system (with NDSF fibers in each span, 5× spans per optical multiplex section (OMS)).

The graphs 80, 82, 84 of FIGS. 5a-5c show SNR penalty for the channels within the C-band being less than ~1.5 dB, which is primarily due to SRS. The bundling graphs presented in this disclosure are for the example of interleaving bundling approach for an ASE-loaded system where each bundle primarily experiences only SRS impacts, and shows similar power and SNR penalties.

For example, the graph 80 of FIG. 5a includes the change (delta) in a launch power profile for C-band only channels after a bundle worth of spectrum is removed. The graph 82 of FIG. 5b includes the delta in linear optical SNR for C-band only channels after a bundle worth of spectrum is removed. Also, the graph 84 of FIG. 5c shows the delta in SNR considering linear and non-linear penalties for C-band only channels after a bundle worth of spectrum is removed.

Figure 6A:
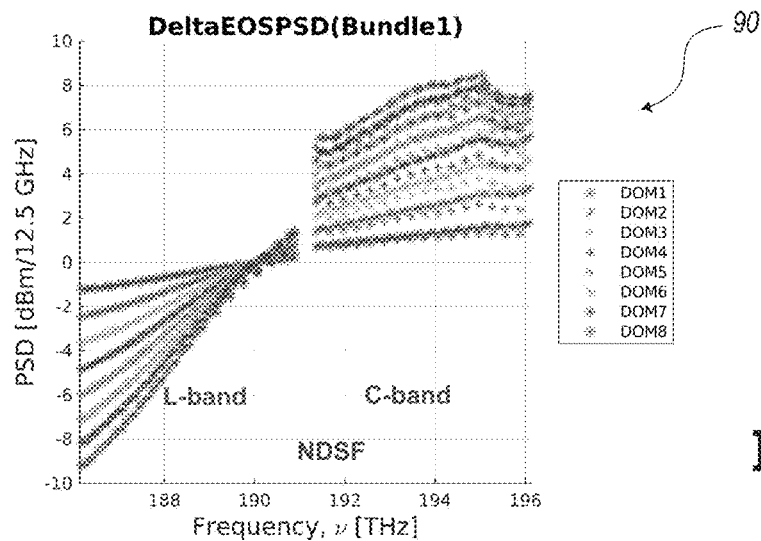
FIGS. 6a-6c are graphs illustrating an example of a bundling impact on a C+L band ASE-loaded system.
Figure 6B:
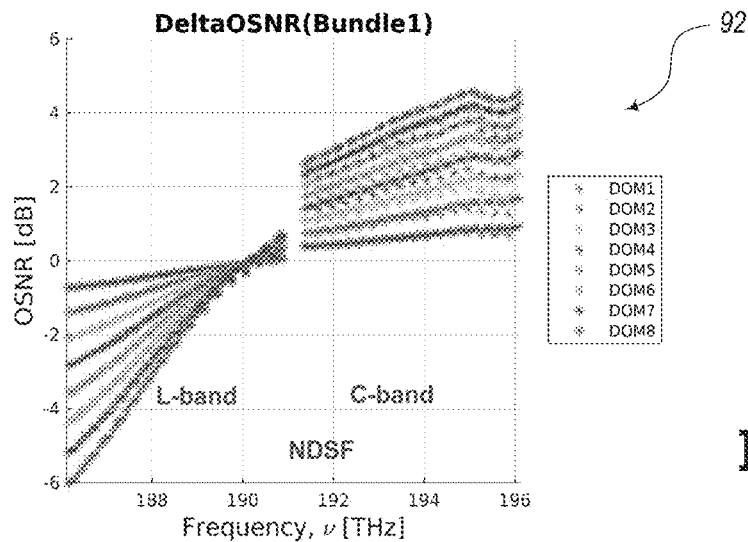
Figure 6C:
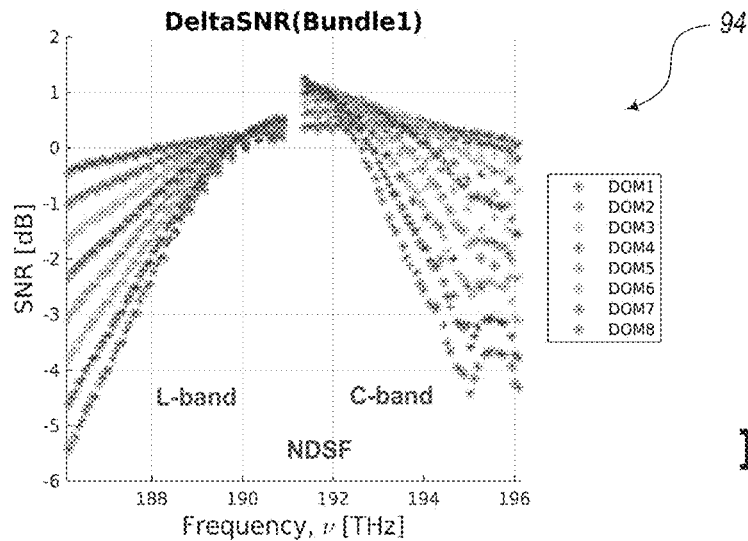

FIGS. 6a-6c are graphs 90, 92, 94 showing an example of a bundling impact on C+L band ASE-loaded system, according to the various embodiments of the present disclosure. The graphs 90, 92, 94 show the bundling impact on C+L band ASE-loaded system for removing 25% of total spectrum in a bundle in an interleaved fashion over a 40×80 km span system (with NDSF fibers in each span, 5× spans per optical multiplex section (OMS)).

The graphs 90, 92, 94 illustrate, in this example, that the traffic channels in L-band spectrum experience the worst SNR penalty (e.g., about 5.5 dB), which is primarily due to loss of power because of SRS. The edge channels in the C-band experience less SNR penalty than the L-band (e.g., about 4.5 dB).

The graph 90 of FIG. 6a shows the delta in launch power profile for C+L-band channels after a bundle worth of spectrum is removed. The graph 92 of FIG. 6b shows the delta in linear optical SNR for C+L-band channels after a bundle worth of spectrum is removed. The graph 94 of FIG. 6c shows the delta in SNR considering linear and non-linear penalties for C+L-band channels after a bundle worth of spectrum is removed.

Figure 7A:
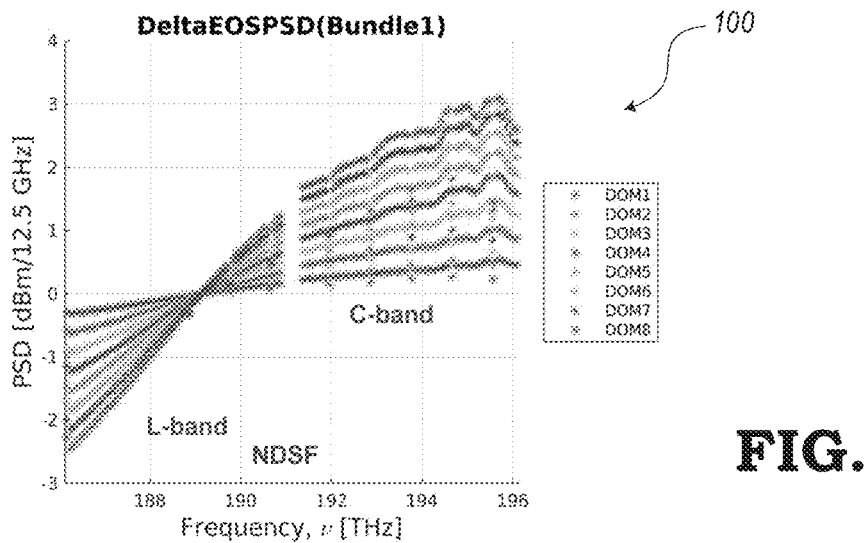
FIGS. 7a-7c are graphs illustrating additional examples of the bundling impact on C+L band ASE-loaded systems.
Figure 7B:
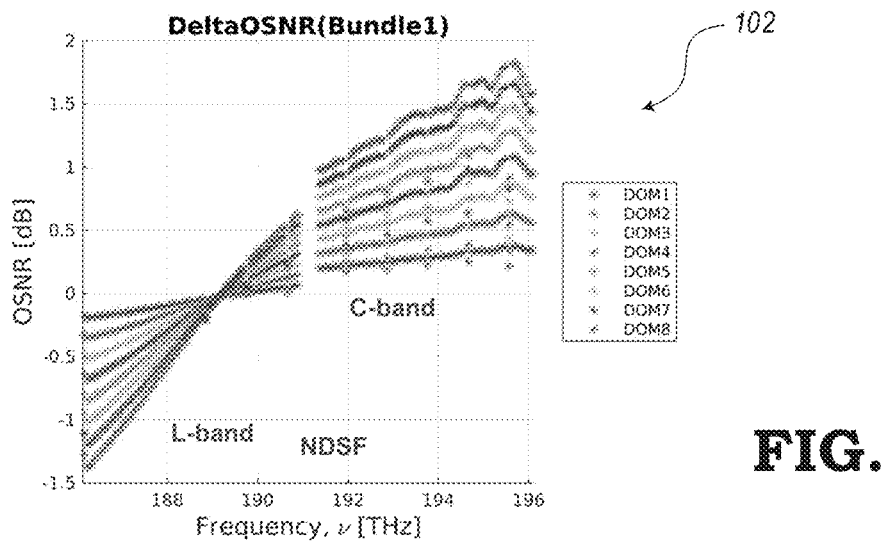
Figure 7C:
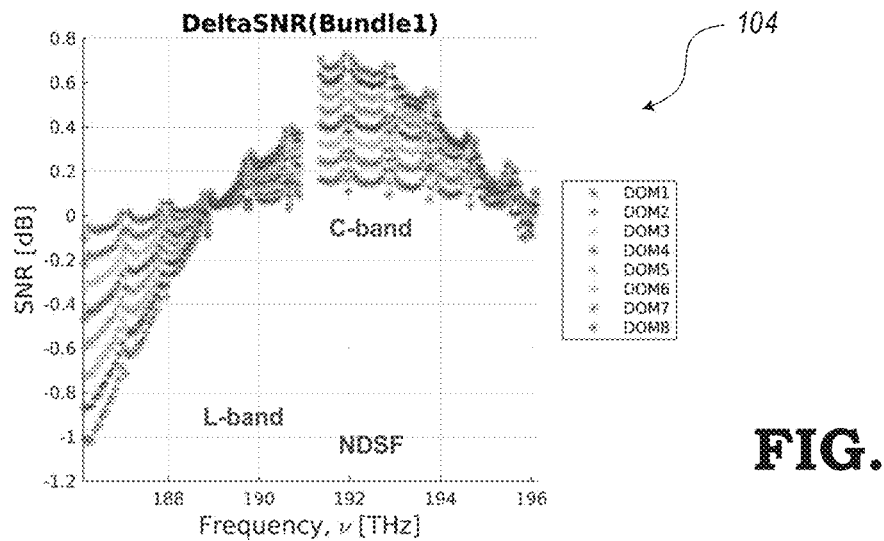

FIGS. 7a-7c include graphs 100, 102, 104 showing additional examples of the bundling impact on C+L band ASE-loaded systems according to the system and methods of the present disclosure. The graphs 100, 102, 104 show the bundling impact on C+L band ASE-loaded system for removing 25% of total spectrum in a bundle in an interleaved fashion over a 40×80 km span system (with NDSF fibers in each span, 5× spans per optical multiplex section (OMS)). The graphs 100, 102, 104 show that traffic channels in L-band spectrum experience the worst SNR penalty (e.g., about 5.5 dB), which is primarily due to loss of power because of SRS. The edge channels in the C-band experience less SNR penalty than the L-band (e.g., about 4.5 dB).

The graph 100 of FIG. 7a shows the delta in launch power profile for C+L-band channels after a bundle worth of spectrum is removed. The graph 102 of FIG. 7b shows the delta in linear optical SNR for C+L-band channels after a bundle worth of spectrum is removed. Also, the graph 104 of FIG. 7c shows the delta in SNR considering linear and non-linear penalties for C+L-band channels after a bundle worth of spectrum is removed.

Figure 8A:
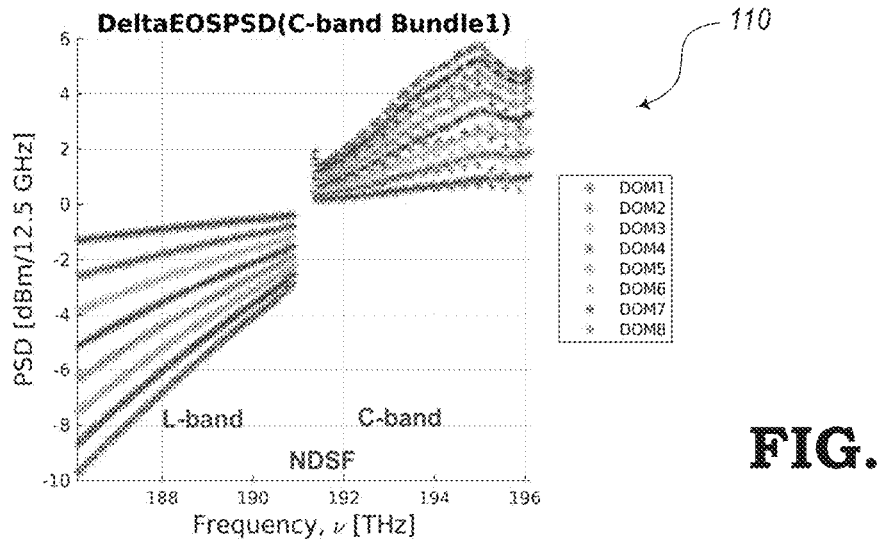
FIGS. 8a-8c are graphs illustrating examples for demonstrating the sensitivity on in-service L-band traffics for activities in the C-band.
Figure 8B:
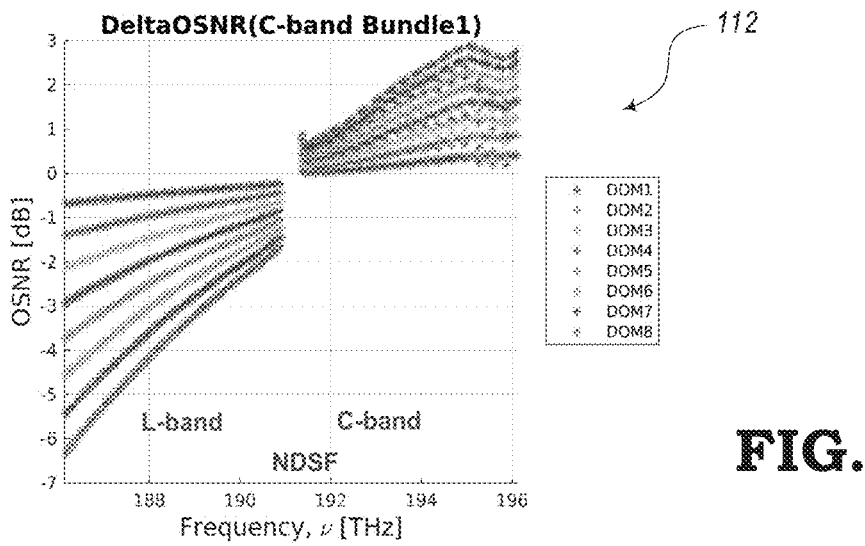
Figure 8C:
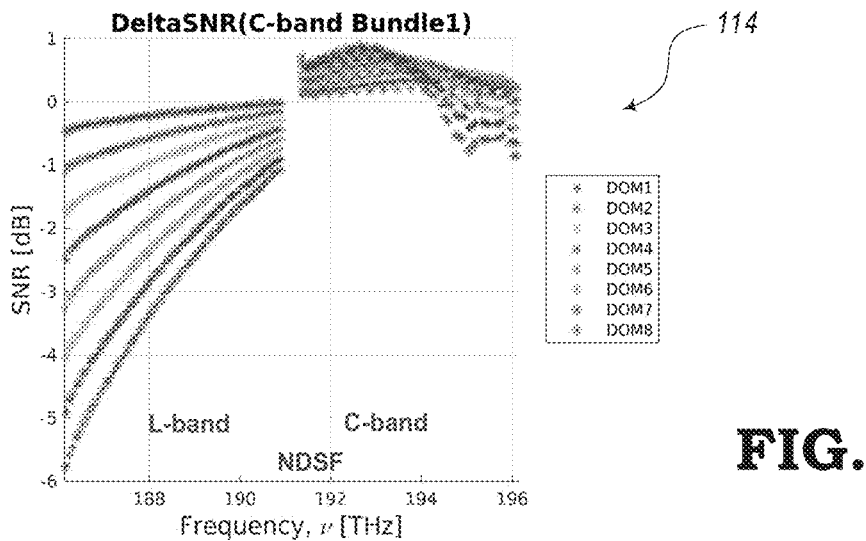

FIGS. 8a-8c illustrate graphs 110, 112, 114 for demonstrating the sensitivity on in-service L-band traffics for activities in the C-band. As mentioned above, in a C+L line system, the impact on in-service traffic channels in each band, due to activities (e.g., capacity changes, ASE replacement, etc.) on the other band, is not the same. When a spectral change takes place in the C-band, the impact on in-service channels in L-band primarily comes from SRS and tilt as L-band optical signals (lower frequency channels) lose optically transmitted power as was previously transferred from higher frequency C-band signals.

The graphs 110, 112, 114 show the impact on L-band in-service channels, by removing 25% of C-band spectrum in a bundle in an interleaved fashion (i.e. 4× bundles in C-band to swap all C-band spectrum from ASE to traffic) over a 40×80 km span system. The graph 110 of FIG. 8a shows the delta in launch power profile, graph 112 of FIG. 8b shows the delta in linear optical SNR, and the graph 114 of FIG. 8c shows the delta in SNR considering linear and non-linear penalties for C+L-band channels after a bundle worth of spectrum is removed.

Figure 9A:
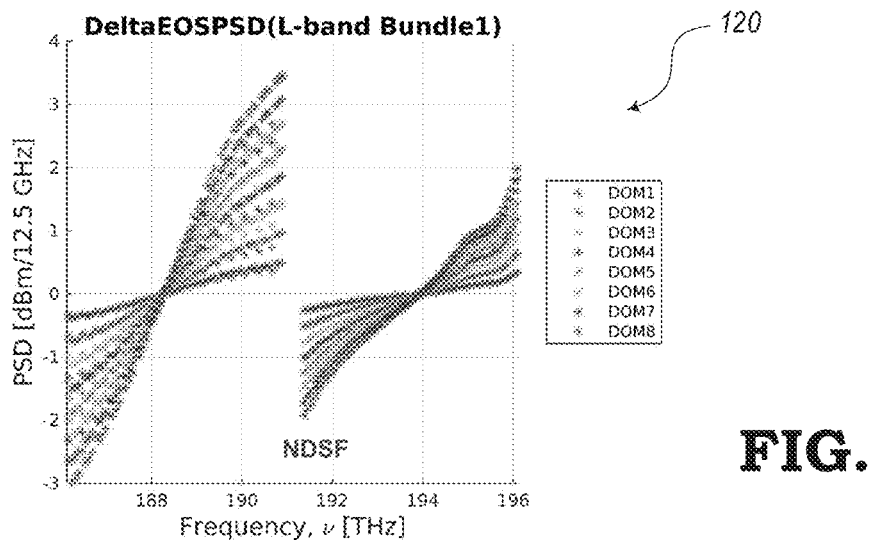
FIGS. 9a-9c are graphs illustrating examples for demonstrating the sensitivity on in-service C-band traffic for activities in L-band.
Figure 9B:
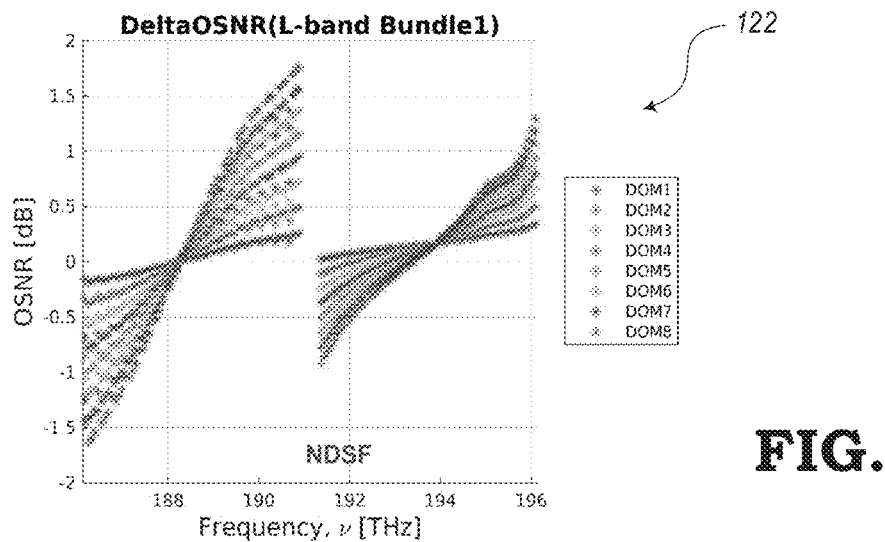
Figure 9C:
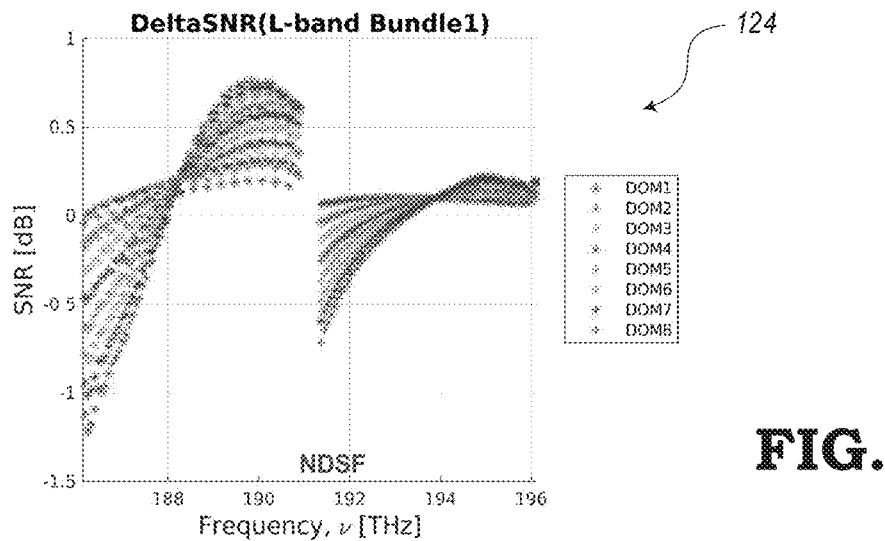

FIGS. 9a-9c illustrate graphs 120, 122, 124 for demonstrating the sensitivity on in-service C-band traffic for activities in L-band. Again, the impact on in-service traffic channels in each band of the C+L system, due to activities (e.g., capacity changes, ASE replacement, etc.) on the other band, is not the same. Similar to the impact shown in FIG. 8, when a spectral change takes place in L-band (as shown in FIG. 9), the impact on existing in-service channels in C-band is very minimal, which also comes primarily from SRS and tilt. However, in this case, the changes in the L-band optical signals (i.e., the lower frequency channels) do not deplete power from higher frequency C-band signals in a significant manner. The graphs 120, 122, 124 show the impact on the C+L band in-service channels, by removing 25% of L-band spectrum in a bundle in an interleaved fashion (e.g., 4× bundles in L-band to swap all L-band spectrum from ASE to traffic) over a 40×80 km span system.

Figure 10A:
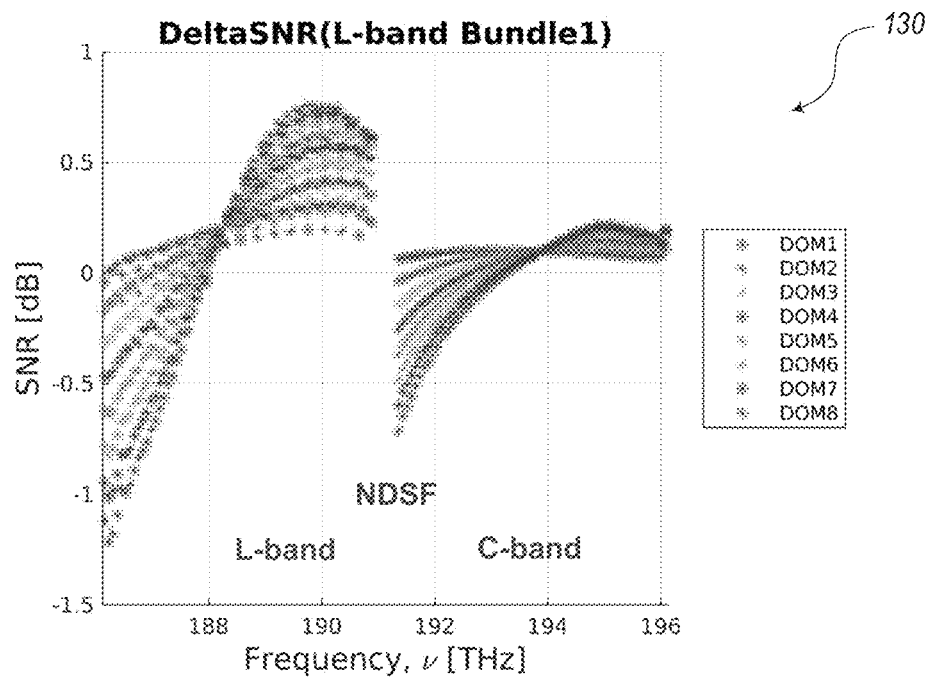
FIGS. 10a and 10b are graphs illustrating an example simulation results of running band-sensitive bundling.
Figure 10B:
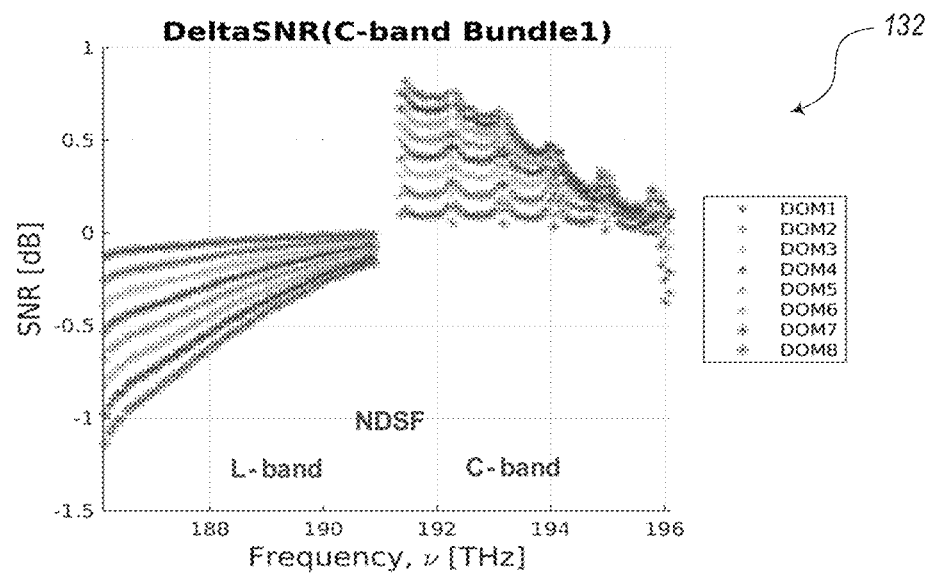

FIGS. 10a and 10b are graphs 130, 132, respectively, showing simulation results of running band-sensitive bundling. The graphs 130, 132 show simulation results for adopting band-sensitive bundling for C+L ASE-loaded system for a 40×80 km NDSF span network. In the L-band, the bundle size can be set to four to ensure any traffics either in L-band or C-band does not see more than 1.5 dB SNR penalty at any given time. A bundle size of four for L-band means all L-band spectrum can be swapped from ASE to traffic signals in four (4×) switching transactions, where, for each transaction, not more than 25% of L-band spectrum is switched from ASE to traffic. Capacity changes in the C-band can be slowed down with an increased bundle size of about 12 in order to limit the SRS impacts on any L-band traffic signals.

The graph 130 of FIG. 10a illustrates the SNR penalty for removing 25% of L-band interleaved spectrum (max bundle count 4×) in a C+L-band ASE-loaded system. The graph 132 of FIG. 10b illustrates the SNR penalty for removing 8.3% of C-band interleaved spectrum (max bundle count 12×) in a C+L-band ASE-loaded system.

Figure 11A:
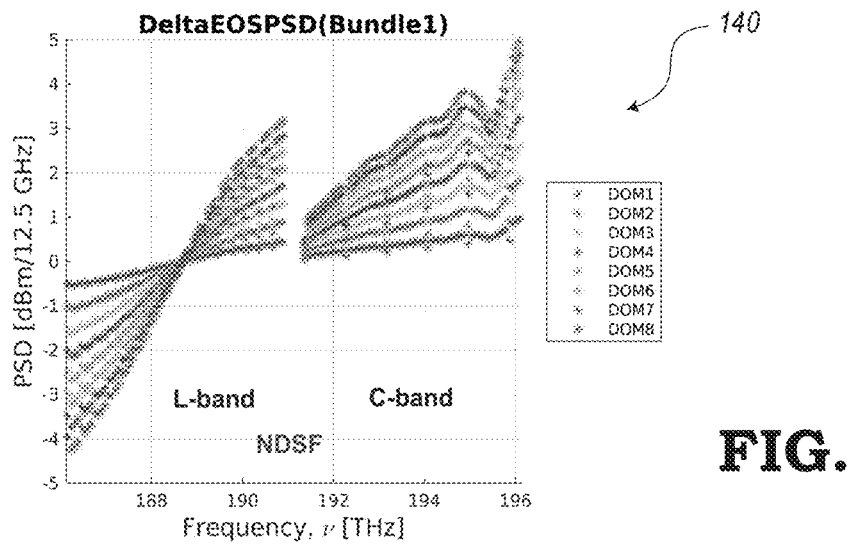
FIGS. 11a-11c are graphs illustrating an example for demonstrating simulation results of running the band-sensitive bundling described with respect to FIG. 10.
Figure 11B:
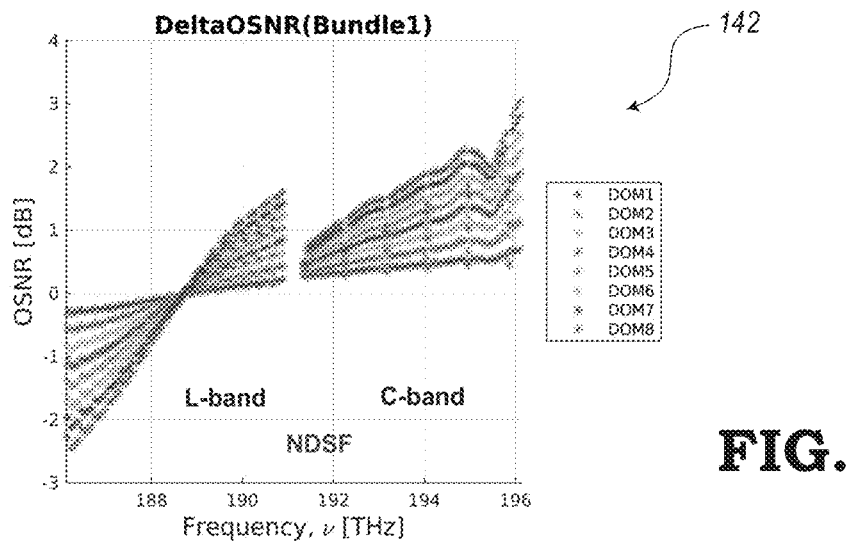
Figure 11C:
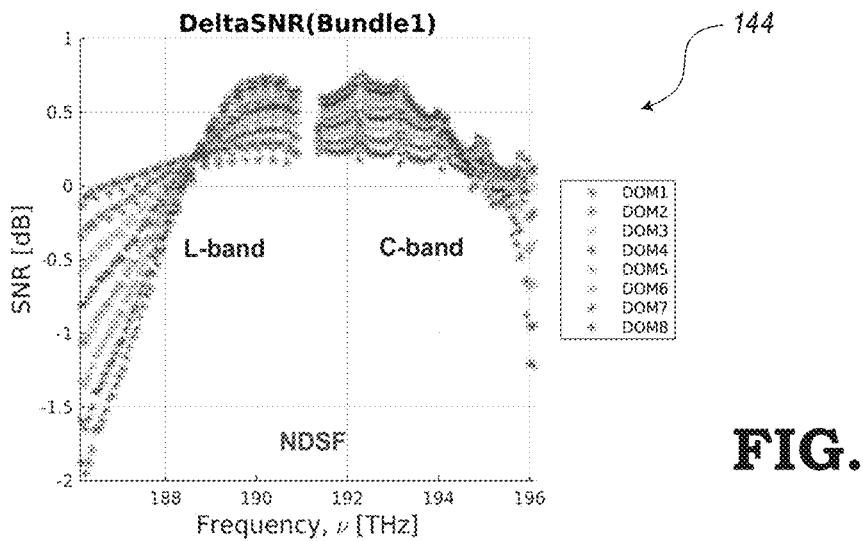

FIGS. 11a-11c show additional graphs 140, 142, 144 for demonstrating examples of simulation results of running the band-sensitive bundling described with respect to FIG. 10. The graphs 140, 142, 144 shows the results confirming that with band-sensitive bundling, by selecting a conservative approach for capacity changes in the C-band and an aggressive approach in the L-band, channel controllers in both bands can operate independently without any sequencing between them.

The graphs 140, 142, 144 show one of the worst-case examples, where about 2 dB SNR penalty is observed for an L-band channel when 25% of the L-band and 8.3% of the C-band spectrum are removed in an interleaving format. The penalty amount for this example is slightly above the C-band only system penalty benchmark (~1.5 dB). However, a key point to be observed from these results is that the L-band and C-band are running two different bundling counts and the L-band bundle count is much more aggressive than the C-band bundle count. For example, the bundling in the L-band may be about three times more aggressive than in the C-band. In order to reduce penalty in the L-band, the bundling count in the L-band, C-band, or both bands can be slightly increased.

The graph 140 of FIG. 11a shows the delta in launch power profile for removing 25% of the L-band and 8.3% of the C-band interleaved spectrum in a C+L-band ASE-loaded system. The graph 142 of FIG. 11b shows the delta in linear optical SNR for removing 25% of the L-band and 8.3% of the C-band interleaved spectrum in a C+L-band ASE-loaded system. The graph 144 of FIG. 11c shows the SNR penalty for removing 25% of the L-band and 8.3% of the C-band interleaved spectrum in the C+L-band ASE-loaded system.

Figure 12A:
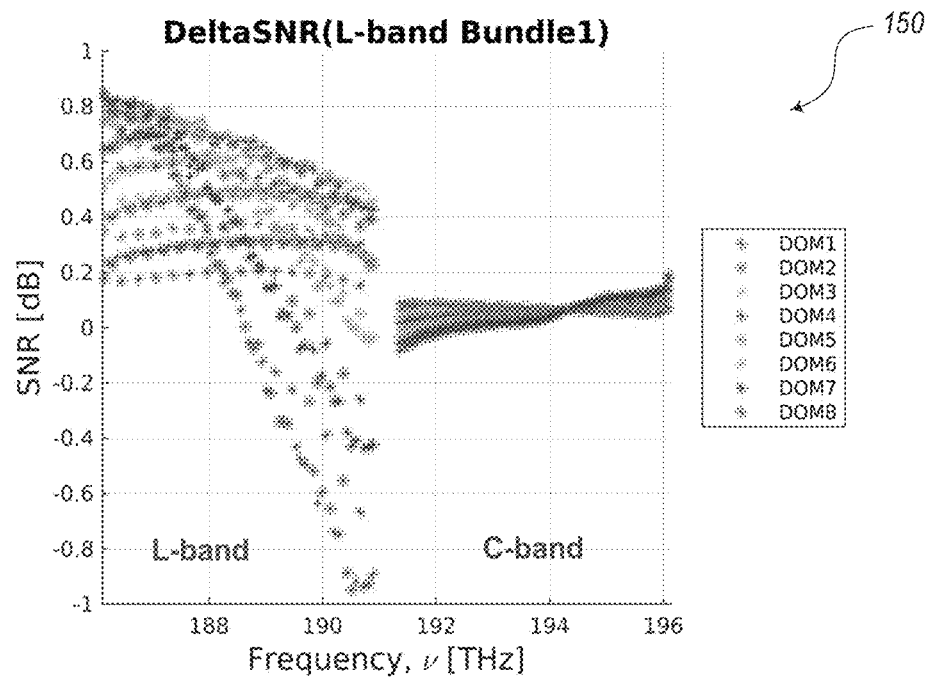
FIGS. 12a and 12b are graphs illustrating examples of band-sensitive bundling at the presence of Raman amplified spans.
Figure 12B:
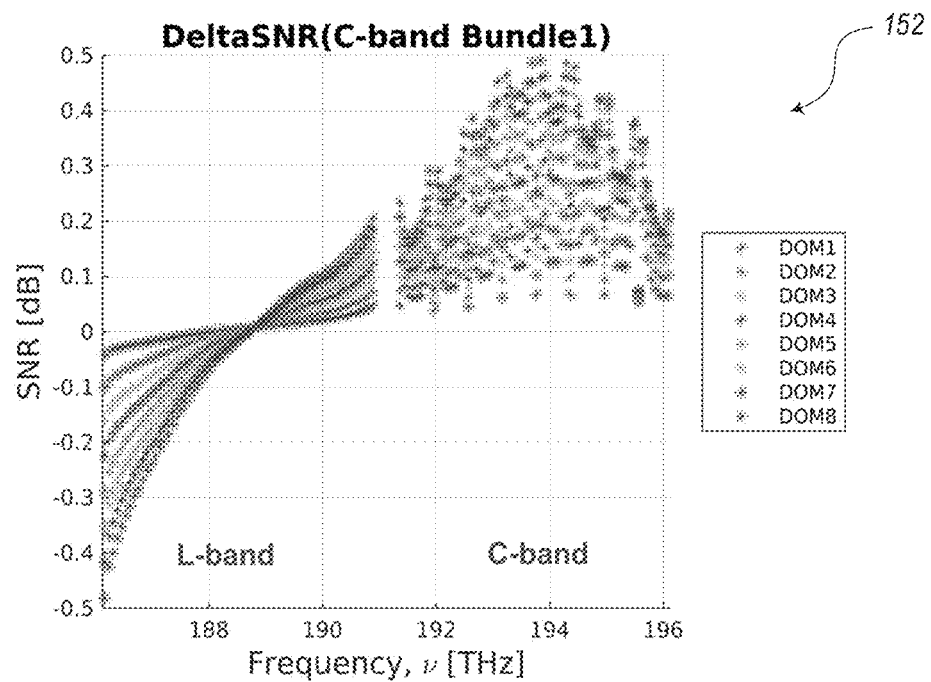

FIGS. 12a and 12b are graphs 150, 152, respectively, showing examples of band-sensitive bundling at the presence of Raman amplified spans. The presence of Raman in a C+L ASE-loaded system may help to reduce the impact of SRS drops for L-band channels. The bundling count can be reduced for the C-band in this case to speed up the overall recovery of the C-band traffic signals. The graphs 150, 152 show the SNR penalties for C-band or L-band traffic signals over a 40×80 km Raman amplified spans (with NDSF fibers in each span, 5× spans per OMS). The graph 150 of FIG. 12a shows the SNR penalty for removing 25% of L-band interleaved spectrum (max bundle count 4×) in a C+L-band ASE-loaded system with Raman amplified spans. The graph 152 of FIG. 12b shows the SNR penalty for removing 12.5% of C-band interleaved spectrum (max bundle count 8×) in a C+L-band ASE-loaded system with Raman amplified spans.

Figure 13A:
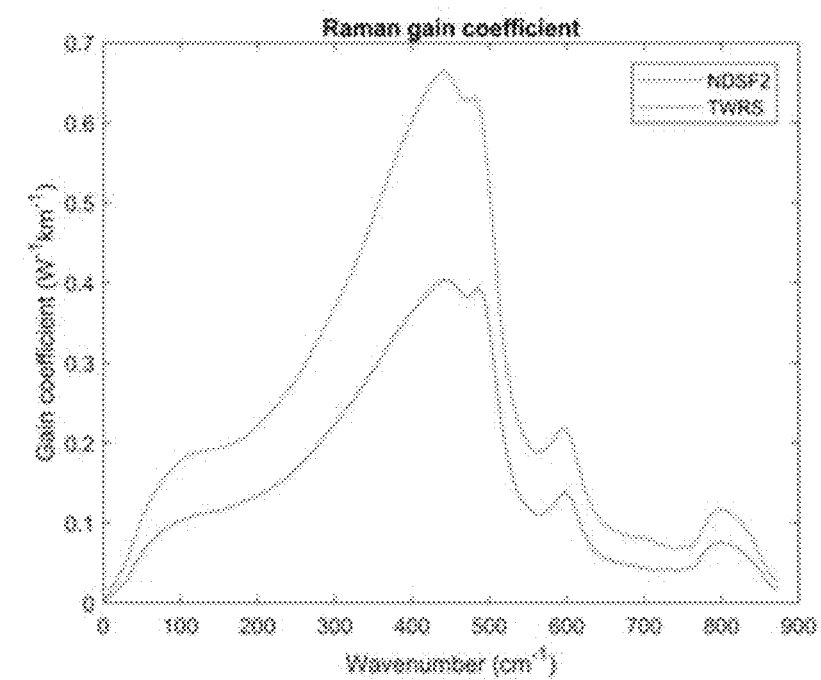
FIGS. 13a and 13b are graphs illustrating an example of the impact of fiber type on SRS and bundling.
Figure 13B:
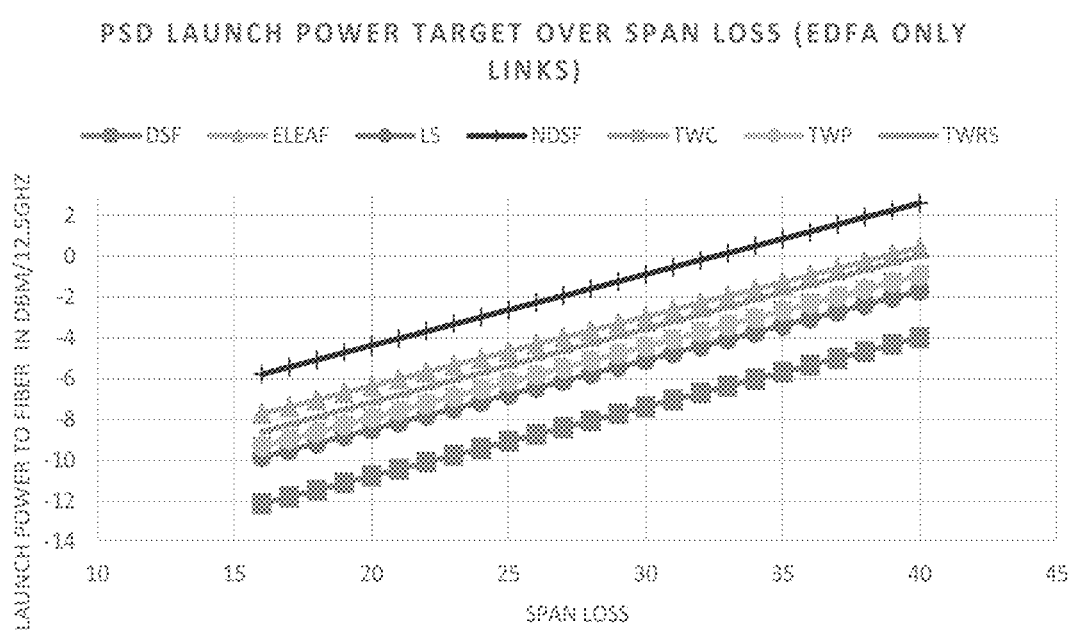

FIGS. 13a and 13b are graphs 160, 162, respectively, showing the impact of fiber type on SRS and bundling. The different fiber types may exhibit different SRS over the fiber transmission medium. For fiber types that exhibit stronger SRS, such as True Wave Reduced Slope (TWRS), one option may include the process of increasing the bundle count in the non-sensitive band to minimize SNE penalty on the traffics in the sensitive band (i.e., lower frequency band). Another option may include the process of reducing the total launch power into the fiber span that mitigates SRS impacts over the sensitive band, and, hence, maintaining a similar bundling count compared to fiber types that exhibit less SRS (e.g., Non-zero Dispersion Shifted Fiber (NDSF)). The graph 160 of FIG. 13a shows the Raman gain coefficient and graph 162 of FIG. 13b shows the PSD launch power target over span loss (e.g., for links with Erbium-Doped Fiber Amplifiers (EDFAs) only).

Figure 14A:
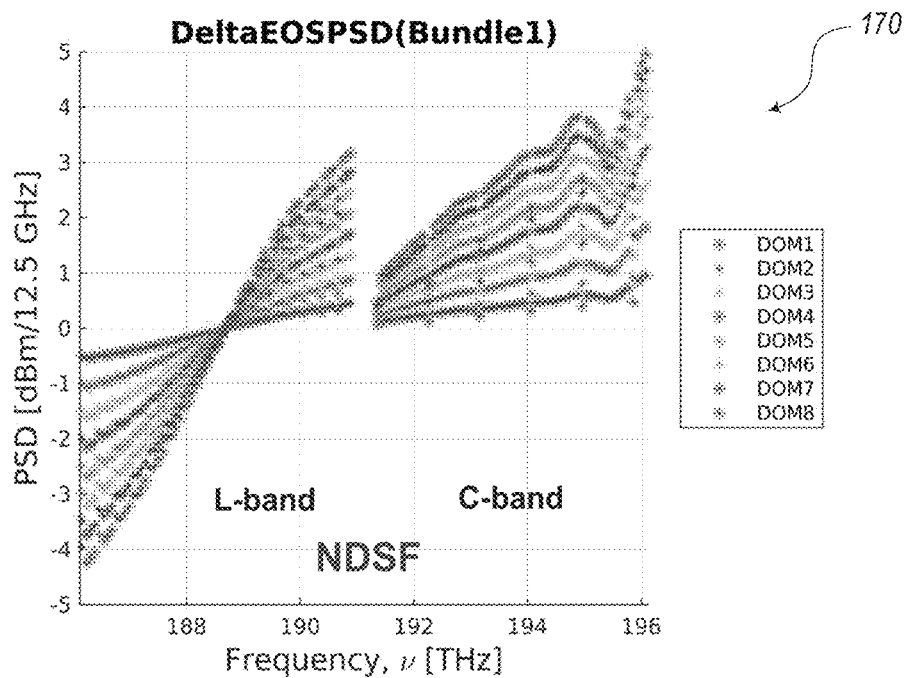
FIGS. 14a-14f are graphs illustrating an example of reducing the total launch power to the fibers.
Figure 14B:
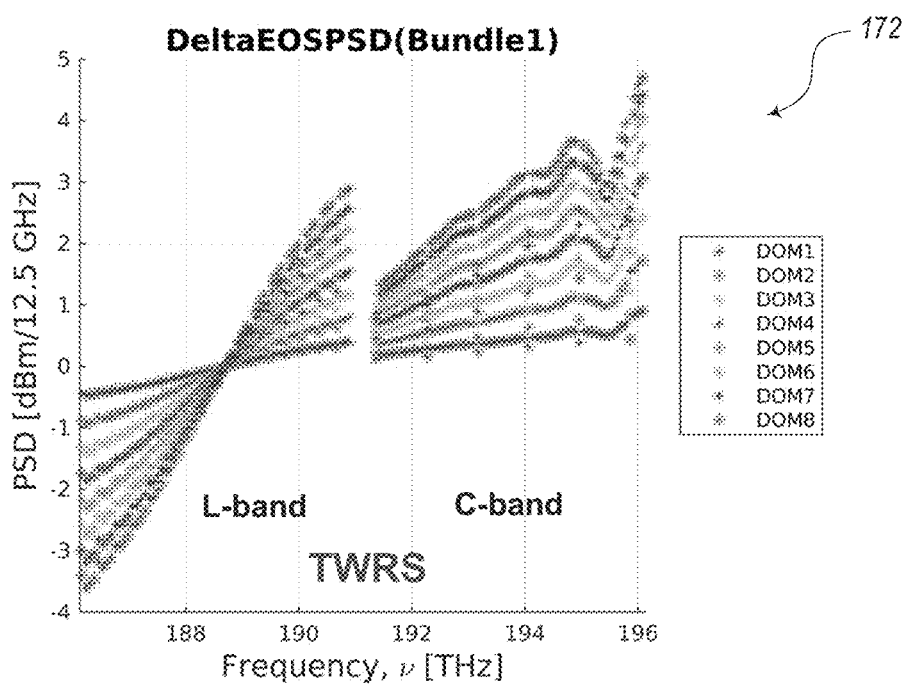
Figure 14C:
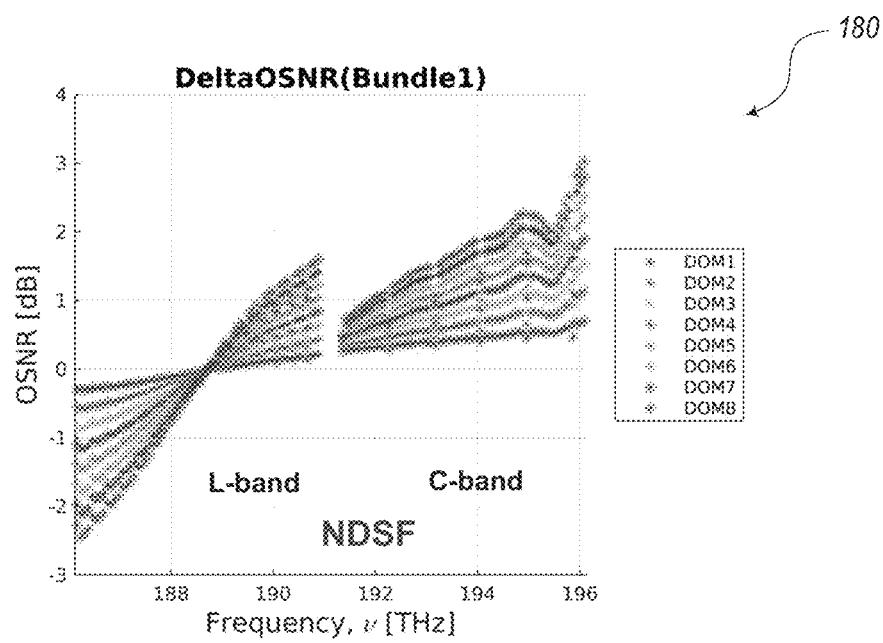
Figure 14D:
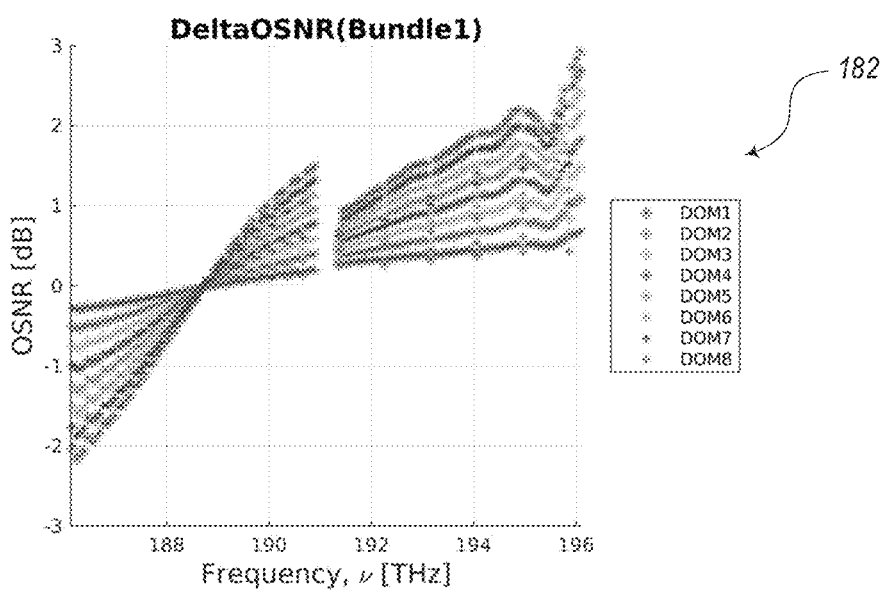
Figure 14E:
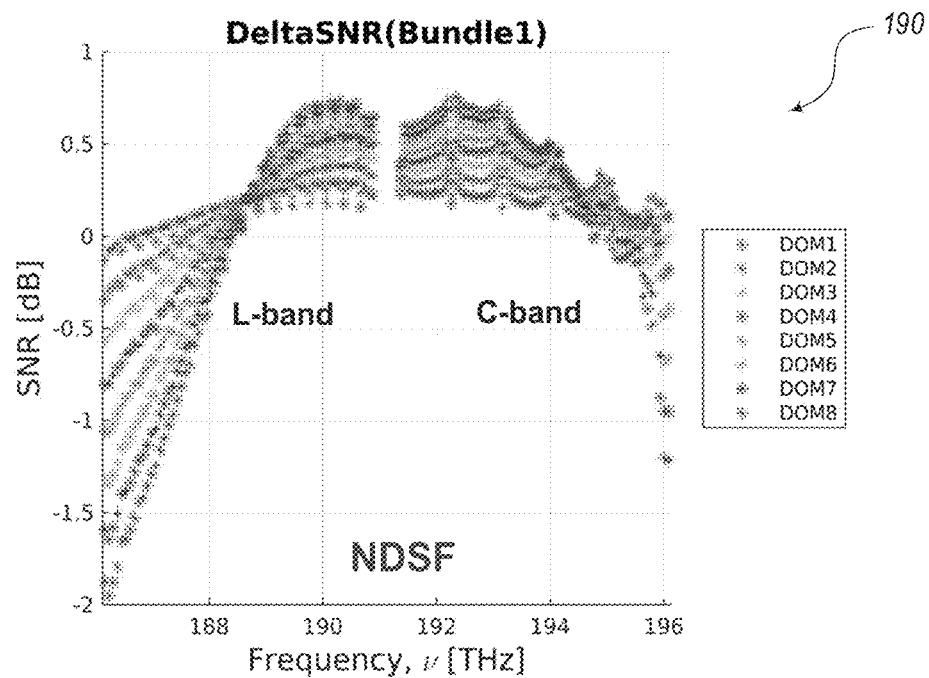
Figure 14F:
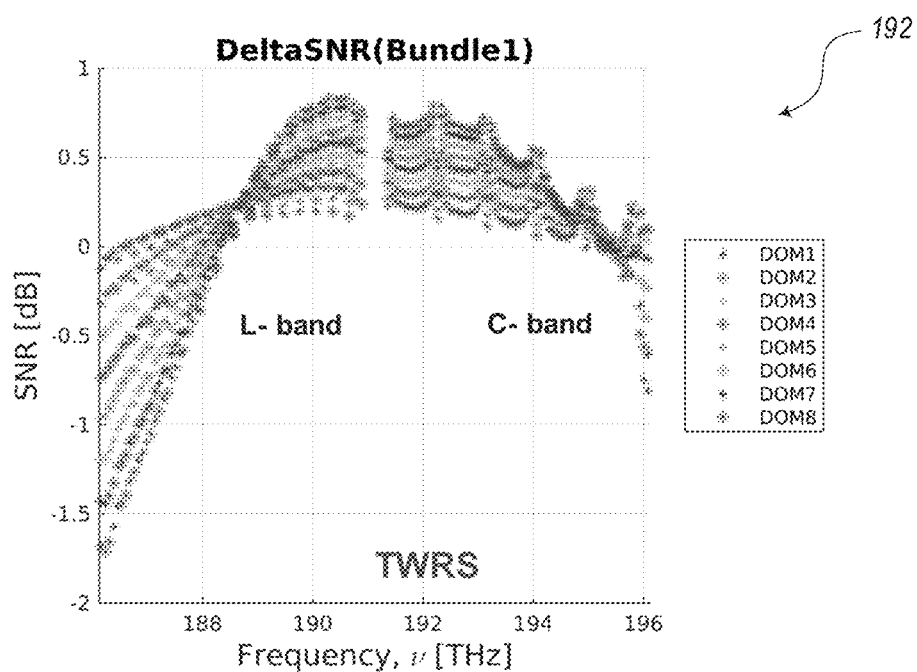

FIGS. 14a-14f illustrate examples of reducing the total launch power to the fibers. The impact of the SRS may be minimized to ensure that the bundling count can remain the same in the bands, irrespective of the fiber types. The graph 170 of FIG. 14a and the graph 172 of FIG. 14b show the delta in launch power profile for removing 25% of the L-band and 8.3% of the C-band interleaved spectrum in a C+L-band ASE-loaded system. The graph 180 of FIG. 14c and the graph 182 of FIG. 14d show the delta in linear optical SNR for removing 25% of L-band and 8.3% of C-band interleaved spectrum in a C+L-band ASE-loaded system. The graph 190 of FIG. 14e and the graph 192 of FIG. 14f show the SNR penalty for removing 25% of L-band and 8.3% of C-band interleaved spectrum in a C+L-band ASE-loaded system.

The following includes examples of simulation results using optical fiber cable designed for high-capacity transmission over long distances, where the optical fiber cable is configured to display low dispersion changes over a waveband. For example, the tested optical fiber cable experiences a dispersion slope over C+L bands than typical fiber optic cables.

Figure 15A:
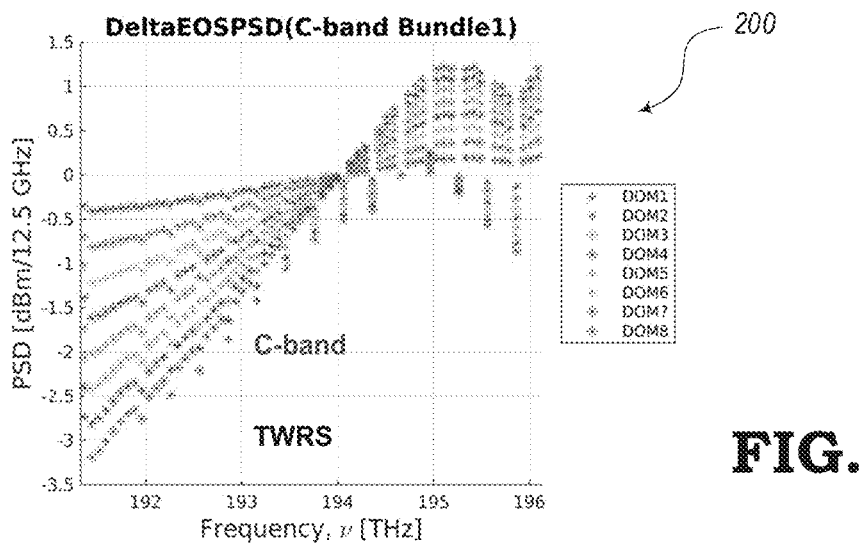
FIGS. 15a-15c are graphs illustrating the simulation results of the wideband dispersion fiber and an example of the bundling impact on C-band only ASE-loaded system.
Figure 15B:
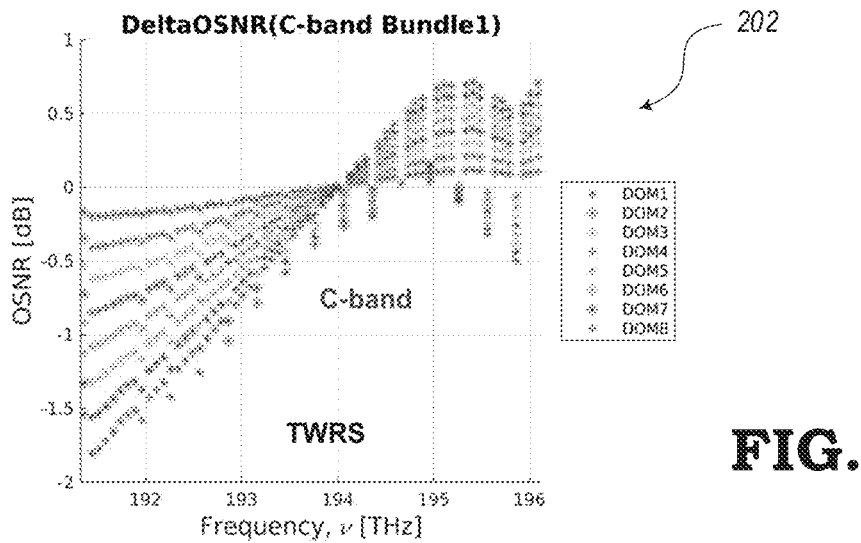
Figure 15C:
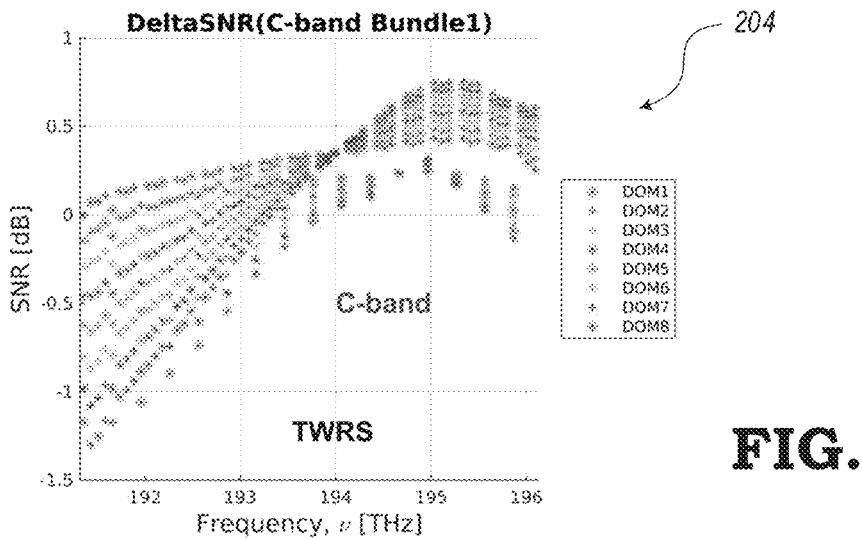

FIGS. 15a-15c includes graphs 200, 202, 204 showing the simulation results of the wideband dispersion fiber and an example of the bundling impact on C-band only ASE-loaded system. The graphs 200, 202, 204 show the bundling impact on a C-only ASE-loaded system for removing 25% of total spectrum in a bundle in an interleaved fashion over a 40×80 km span system (with NDSF fibers in each span, 5× spans per optical multiplex section (OMS)). The graphs 200, 202, 204 show the SNR penalty for channels within the band being less than about 1.5 dB, which may primarily be due to SRS. The bundling graphs 200, 202, 204 presented in the present disclosure are for the example of an interleaving bundling approach for an ASE-loaded system where each bundle primarily experiences only SRS impacts. However, the graphs also show similar power and SNR penalties.

The graph 200 of FIG. 15a shows the delta in launch power profile for C-band only channels after a bundle worth of spectrum is removed. The graph 202 of FIG. 15b shows the delta in linear optical SNR for C-band only channels after a bundle worth of spectrum is removed. Also, the graph 204 of FIG. 15c shows the delta in SNR considering linear and non-linear penalties for C-band only channels after a bundle worth of spectrum is removed.

Figure 16A:
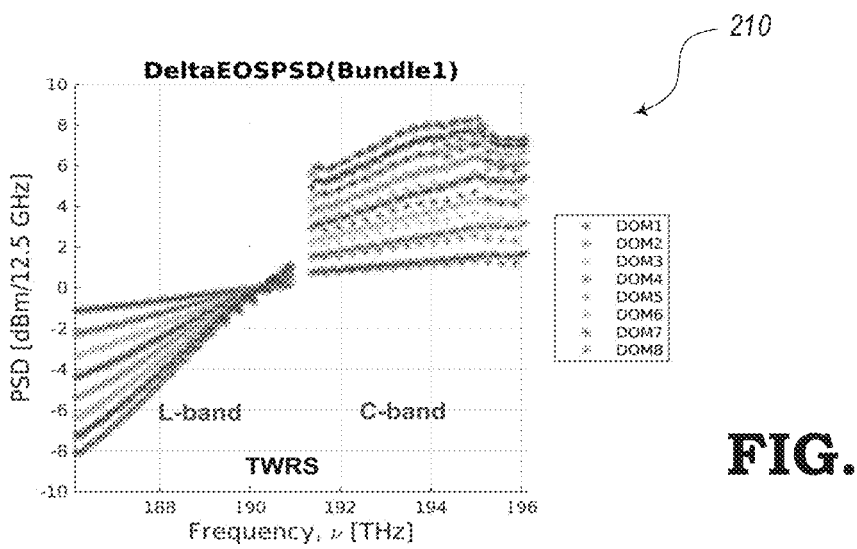
FIGS. 16a-16c are graphs illustrating an example of the bundling impact on a C+L band ASE-loaded system.
Figure 16B:
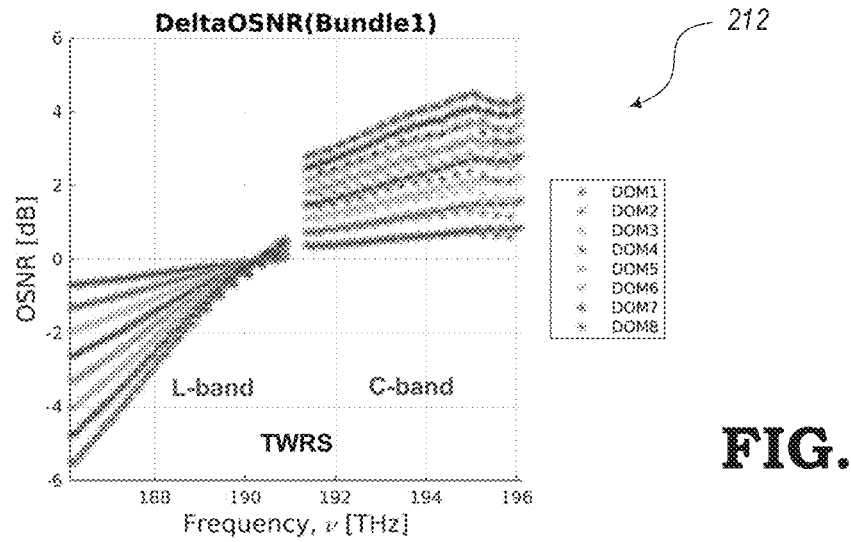
Figure 16C:
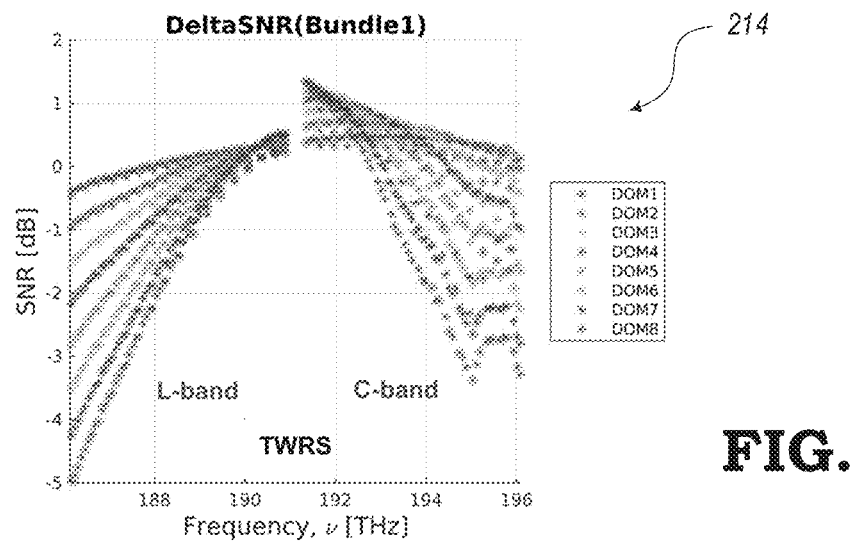

FIGS. 16a-16c are graphs 210, 212, 214 showing an example of the bundling impact on a C+L band ASE-loaded system. The graphs 210, 212, 214 show the bundling impact on C+L band ASE-loaded system for removing 25% of total spectrum in a bundle in an interleaved fashion over a 40×80 km span system (with NDSF fibers in each span, 5× spans per optical multiplex section (OMS)). The graphs show that traffic channels in the L-band experience the worst SNR penalty (e.g., about 5.5 dB) that is primarily due to loss of power because of SRS. The edge channels in the C-band may experience slightly less penalty (e.g., about 4.5 dB) than the L-band.

The graph 210 of FIG. 16a shows the delta in launch power profile for C+L-band channels after a bundle worth of spectrum is removed. The graph 212 of FIG. 16b shows the delta in linear optical SNR for C+L-band channels after a bundle worth of spectrum is removed. Also, the graph 214 of FIG. 16c shows the delta in SNR considering linear and non-linear penalties for C+L-band channels after a bundle worth of spectrum is removed.

Figure 17A:
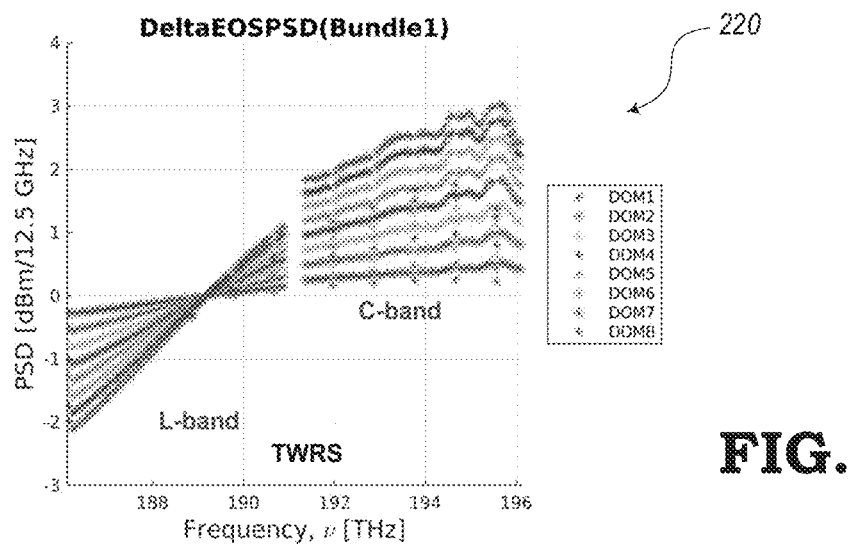
FIGS. 17a-17c are graphs illustrating an example of the bundling impact on C+L Band ASE-loaded system.
Figure 17B:
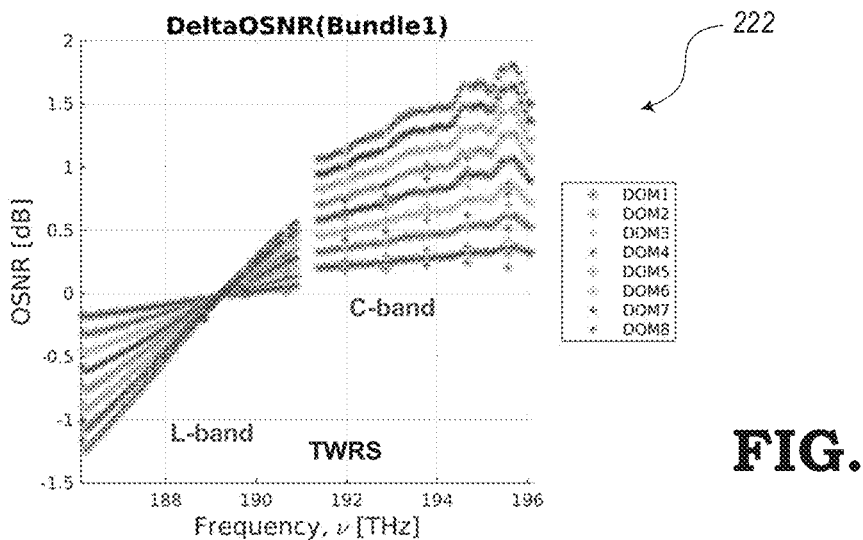
Figure 17C:
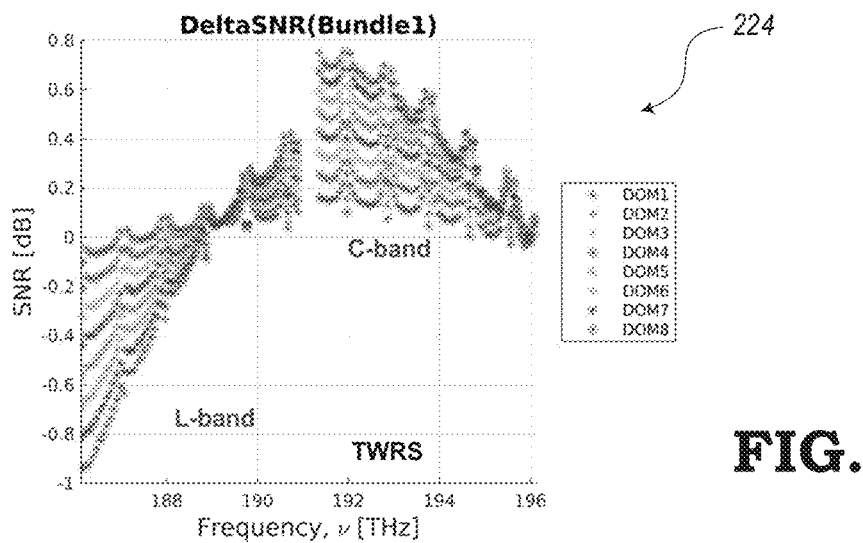

FIGS. 17a-17c are graphs 220, 222, 224 showing an example of the bundling impact on C+L Band ASE-loaded system. The graphs 220, 222, 224 show the bundling impact on C+L band ASE-loaded system for removing 8.3% of total spectrum in a bundle in an interleaved fashion (i.e., total number of bundles being equal to 12) over a 40×80 km span system. The graphs show that with a larger number of bundles (e.g., 12), the SNR penalty for any part of the spectrum gets reduced and achieves parity SNR penalty as in the C-band-only system (i.e., less than about 1.5 dB SNR penalty). This example highlights the issues with conventional system where more bundling requires more time for capacity changes, causes more delay in the time critical Layer 0 restoration, and/or delays the recovery process following a fix in a fiber fault.

The graph 220 of FIG. 17a shows the delta in launch power profile for C+L-band channels after a bundle worth of spectrum is removed. The graph 222 of FIG. 17b shows the delta in linear optical SNR for C+L-band channels after a bundle worth of spectrum is removed. The graph 224 of FIG. 17c shows the delta in SNR considering linear and non-linear penalties for C+L-band channels after a bundle worth of spectrum is removed.

Figure 18A:
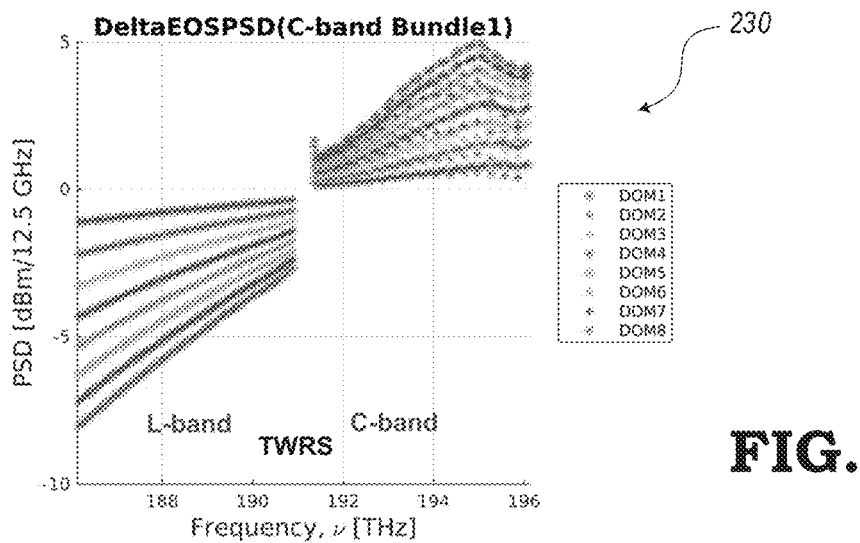
FIGS. 18a-18c are graphs illustrating the sensitivity on in-service L-band traffic signals for activities in the C-band.
Figure 18B:
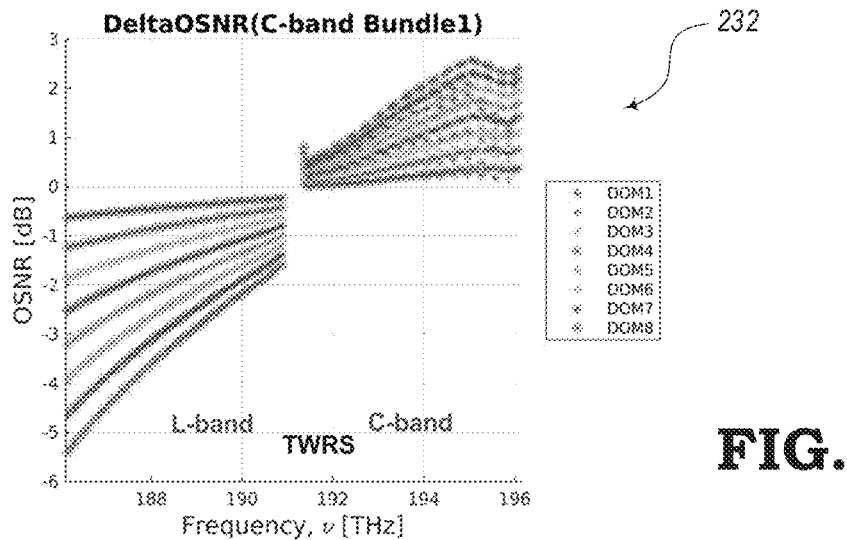
Figure 18C:
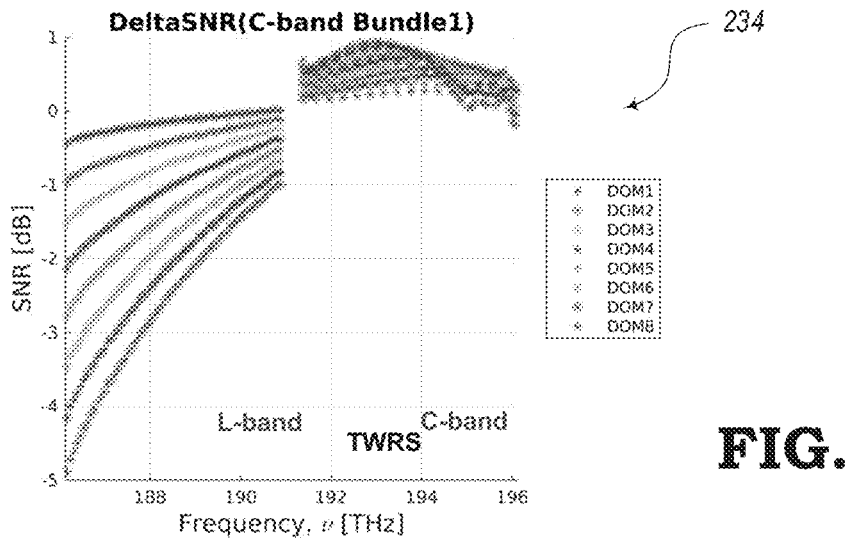

FIGS. 18a-18c include graphs 230, 232, 234 showing the sensitivity on in-service L-band traffic signals for activities in the C-band. However, in a C+L line system, the impact on in-service traffic channels in one band due to activities on the other band (such as capacity changes, ASE replacement) is not the same, as mentioned above. When a spectral change takes place in the C-band, the impact on in-service channels in the L-band primarily comes from SRS and tilt as the L-band optical signals (i.e., lower frequency channels) lose optically transmitted power, as was previously transferred from higher frequency C-band signals. The graphs 230, 232, 234 show the example of the impact on any L-band in-service channel by removing 25% of the C-band spectrum in a bundle in an interleaved fashion (i.e., four bundles in the C-band to swap the C-band spectrum from ASE channel holders to traffic channels) over a 40×80 km span system.

Figure 19A:
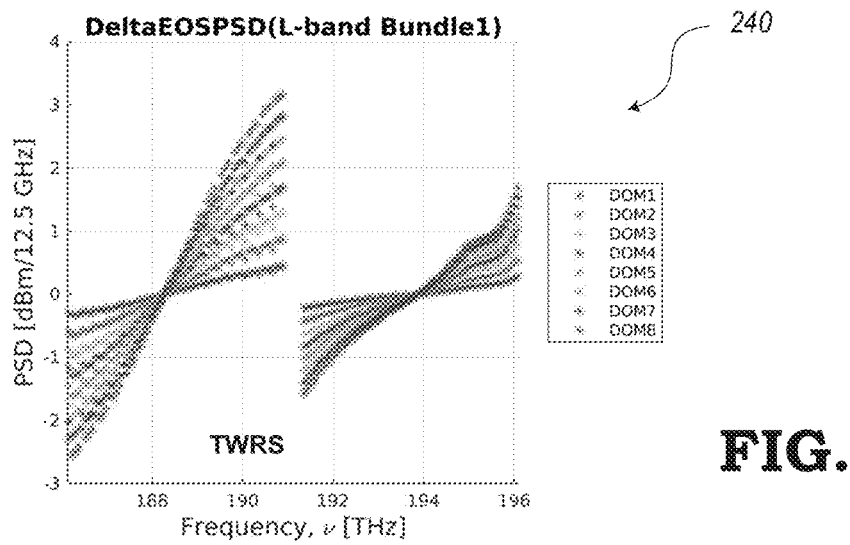
FIGS. 19a-19c are graphs illustrating the sensitivity on in-service C-band traffic for activities in the L-band.
Figure 19B:
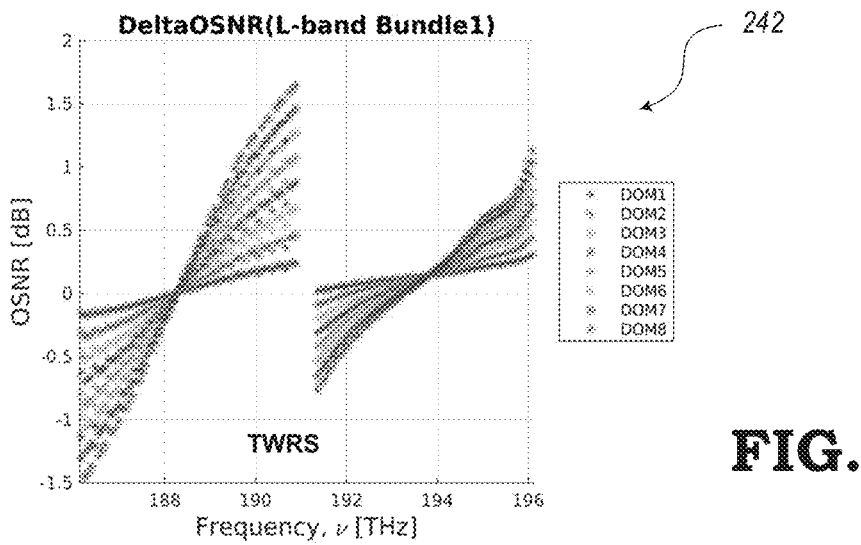
Figure 19C:
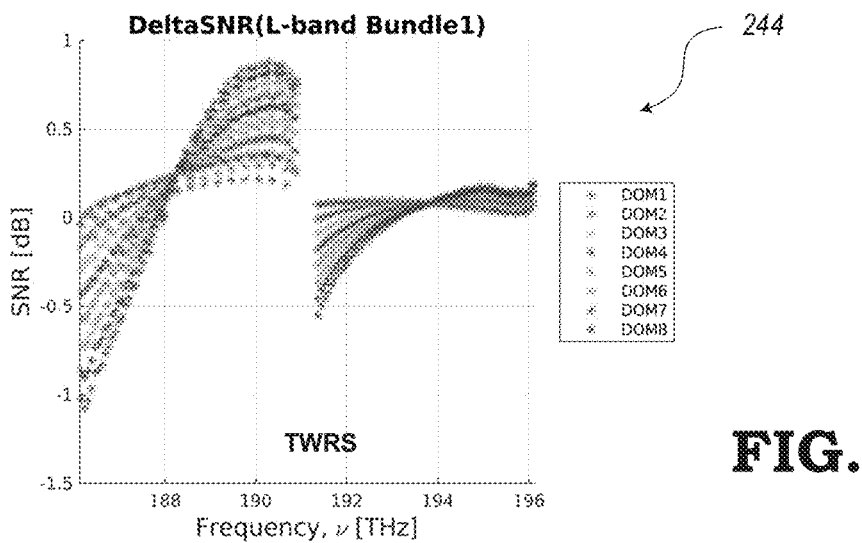

FIGS. 19a-19c are graphs 240, 242, 244 showing the sensitivity on in-service C-band traffic for activities in the L-band. Similarly, when a spectral change takes place in the L-band, the impact on existing in-service channels in the C-band (e.g., primarily from SRS and tilt) may be minimal. However, in this case, the changes in the L-band optical signals (i.e., lower frequency channels) do not deplete a significant amount of power from the higher frequency C-band signals. The graphs 240, 242, 244 show the impact on any C+L band in-service channels, by removing 25% of L-band spectrum in a bundle in an interleaved fashion (i.e., four bundles in the L-band to swap the L-band spectrum from ASE to traffic) over a 40×80 km span system.

Figure 20A:
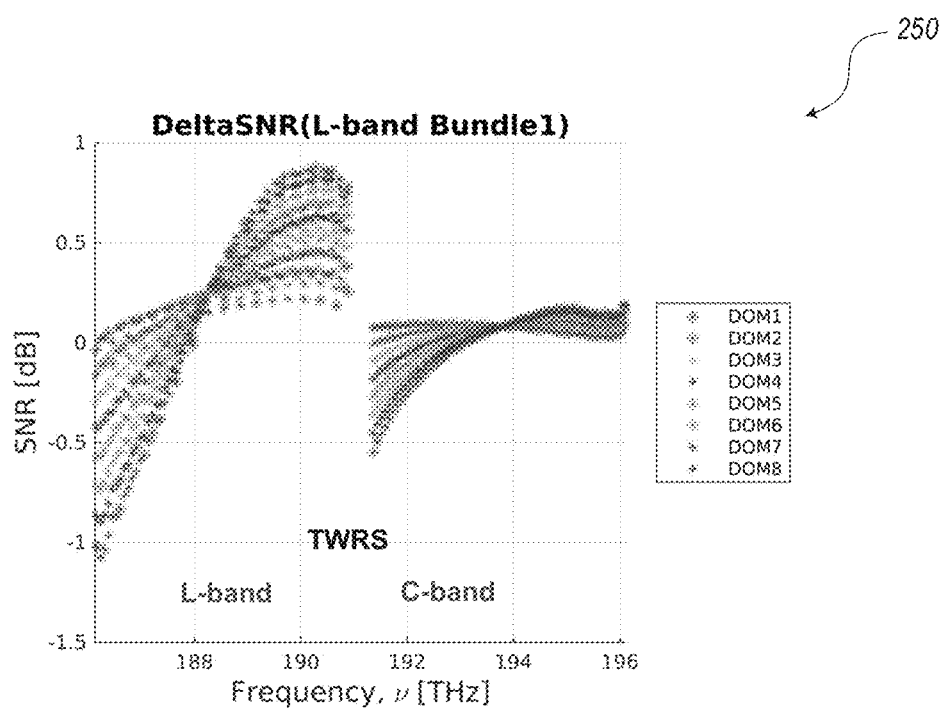
FIGS. 20a and 20b are graphs illustrating simulation results of running a band-sensitive bundling procedure.
Figure 20B:
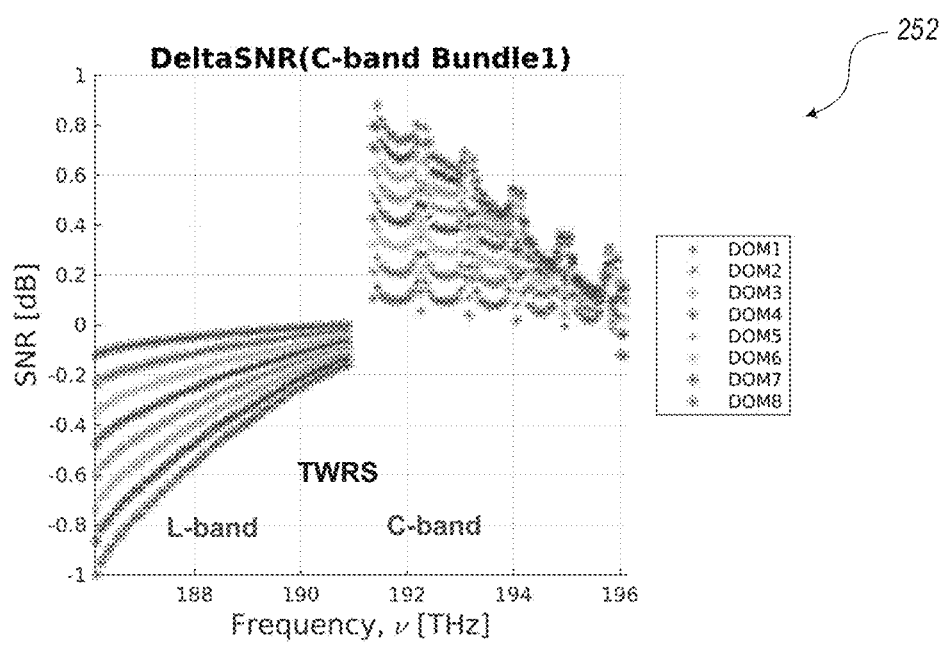

FIGS. 20a and 20b are graphs 250, 252, respectively, showing simulation results of running a band-sensitive bundling procedure. The graphs 250, 252 show simulation results for adopting band-sensitive bundling for C+L ASE-loaded system for a 40×80 km NDSF span network. In the L-band, the number of bundles can be set to four to ensure any traffic signals in either the L-band or C-band do not see more than 1.5 dB SNR penalty at any given time. A number of four bundles for the L-band means the L-band spectrum can be swapped from ASE channel holders to traffic signals (or vice versa) in four switching transactions, where for each transaction not more than 25% of L-band spectrum is switched from ASE to traffic. Capacity changes in the C-band, however, may need to be slowed down with an increased number of bundles of 12, whereby each bundle includes fewer channels, in order to limit the SRS impacts on the L-band traffic signals.

The graph 250 of FIG. 20a shows SNR penalty for removing 25% of the L-band interleaved spectrum (max bundle count 4×) in a C+L-band ASE-loaded system. The graph 252 of FIG. 20b shows SNR penalty for removing 8.3% of C-band interleaved spectrum (max bundle count 12×) in a C+L-band ASE-loaded system.

Figure 21A:
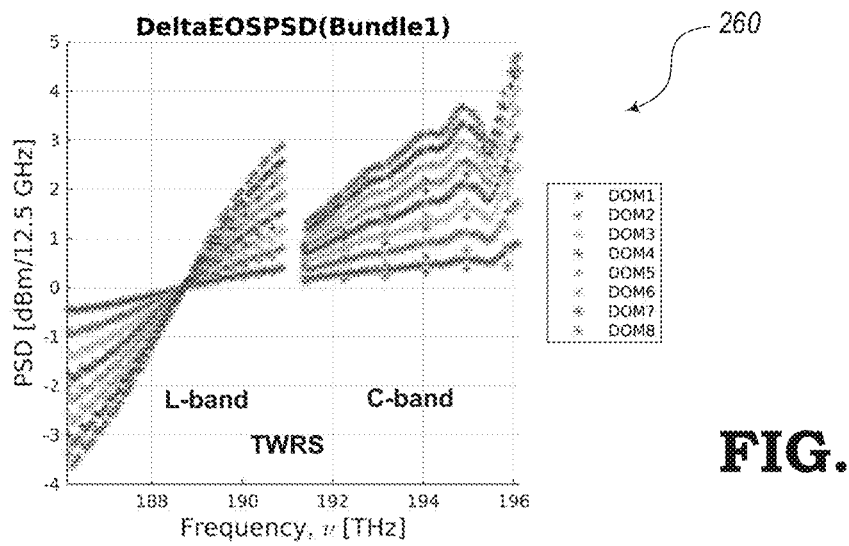
FIGS. 21a-21c are graphs illustrating further simulation results of running the band-sensitive bundling process described with respect to FIG. 20.
Figure 21B:
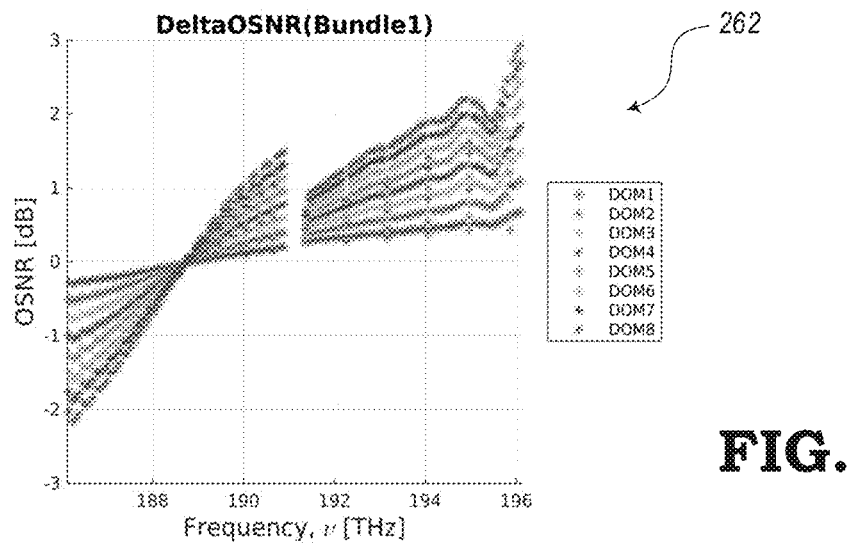
Figure 21C:
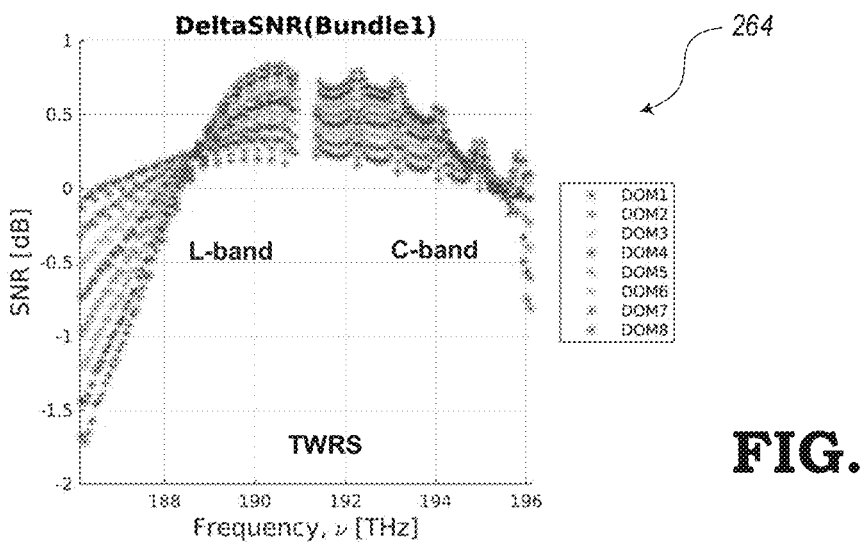

FIGS. 21a-21c includes graphs 260, 262, 264 that illustrate further simulation results of running the band-sensitive bundling process described with respect to FIG. 20. The graphs 260, 262, 264 show results that confirm that, with band-sensitive bundling, by selecting a more conservative approach for capacity changes in the C-band and a more aggressive approach in the L-band, channel controllers in both bands can operate independently without any sequencing between them.

The graphs 260, 262, 264 show one of the worst-case examples, where about 2 dB SNR penalty is observed for an L-band channel, when 25% of the L-band and 8.3% of the C-band spectrum are removed in an interleaving format. The penalty amount in this example is slightly above the C-band-only system penalty benchmark (e.g., about 1.5 dB). However, a key point in this example is that the L-band and C-band are running two different channel bundling processes to obtain different numbers of bundles. The L-band bundle count may be much more aggressive than the C-band bundle count. For example, the bundling in the L-band may be about three times more aggressive than in the C-band). In order to reduce the penalty in the L-band, bundling count in the L-band, C-band, or in both bands, can be slightly increased.

The graph 260 of FIG. 21a shows the delta in launch power profile for removing 25% of L-band and 8.3% of C-band interleaved spectrum in a C+L-band ASE-loaded system. The graph 262 of FIG. 21b shows the delta in linear optical SNR for removing 25% of L-band and 8.3% of C-band interleaved spectrum in a C+L-band ASE-loaded system. Also, the graph 264 of FIG. 21c shows the SNR penalty for removing 25% of the L-band and 8.3% of the C-band interleaved spectrum in a C+L-band ASE-loaded system.

Therefore, the systems and methods of the present disclosure may include certain improvements over conventional systems. When expanded beyond a C-band-only system by increasing the bandwidth to include C+L channels, an optical system according to the embodiments of the present disclosure may include channel swapping strategies that minimize the negative impact that the changes in one band may have on the other band. The strategies may be based on an understanding of the band sensitivity between the C-band (i.e., higher frequency) signals and the L-band (i.e., lower frequency) signals in the C+L optical system, and taking advantage of that knowledge to make faster restoration, channel add/delete, and fault recovery in the L-band, instead of penalizing both the C-band and L-band.

The systems and method of the present disclosure can make the C-band and L-band capacity change activity independent of each other by applying band-sensitive weight factors on their respective bundle counts to limit the maximum amount of spectrum that can be swapped out for a given band at any given time, irrespective of any sequence. This may include dynamically slowing down capacity change activity in the C-band based on traffic presence on the L-band. Since conventional solutions are typically applied to C-band-only systems, the separation of the channel swapping strategies of the present disclosure may be performed on the two bands in parallel. The parallel swapping of bundles in the C-band and L-band is therefore novel in a C+L optical system. More particular, the conventional systems do not allow two bundles to be switched or swapped at the same time, as may be allowed according to the embodiments described herein.

The present embodiments may include any given section multiplexer in a C+L ASE-loaded system, where add traffic channels are only in the C-band and where replacement of an entire spectrum from ASE to traffic is performed. Before replacing, the present embodiments may ensure signal power is present for all traffic channels at the multiplexer input. This may be observed by taking note of the bundles being applied for swapping out ASE to traffic. For example, an external OSA can be placed on the section multiplexer line-out port facing a span fiber and continuously monitoring the C+L band spectrum.

Also, by repeating these steps for adding L-band channels in the L-band spectrum, and taking note of the total number of bundles being applied to swap out between ASE channel holders and traffic channels, if may be determined that the bundle count for L-band signals added is different than the bundle count for C-band signals added to observe that the present systems are operating according the detailed description of the present disclosure. If the number of bundles or the number of channels in each bundle different between the C-band and L-band, then it can be observed that the embodiments of the present disclosure are operating as described herein.

As a result of the various embodiments described herein, the systems and methods may provide certain benefits. For example, the C+L system deployment may be considered to be one of key target deliverables for a provider. The systems may be incorporated in existing servers, routers, switches, or other network devices of an optical system. The network device may be configured to deliver a C+L ASE-loaded system to customers for setting up an optical network. With C+L deployment, it may be important not to significantly slow down the processes of channel addition and/or deletion and Layer 0 restoration activity. The systems and methods described herein can provide the ability to be more spectral-band respective and offer customers flexible solutions to prioritize and achieve time-critical restoration in certain spectral bands.

Although the present disclosure has been illustrated and described herein with reference to exemplary embodiments providing various advantages, it will be readily apparent to those of ordinary skill in the art that other embodiments may perform similar functions, achieve like results, and/or provide other advantages. Modifications, additions, or omissions may be made to the systems, apparatuses, and methods described herein without departing from the spirit and scope of the present disclosure. All equivalent or alternative embodiments that fall within the spirit and scope of the present disclosure are contemplated thereby and are intended to be covered by the following claims.

What is claimed is:

1. A non-transitory computer-readable medium configured to store computer logic having instructions that, when executed, cause one or more processing devices to
swap a first group of channels or first portion of spectrum on an optical link in a more-sensitive frequency band with a first set of replacement channels or first portion of replacement spectrum using a first swapping technique, and
swap a second group of channels or second portion of spectrum on the optical link in a less-sensitive frequency band with a second set of replacement channels or second portion of replacement spectrum using a second swapping technique that is different from the first swapping technique,
wherein the first and second swapping techniques are based at least in part on the number of channels or portion of spectrum that can be swapped at any given time instance on the optical link.

2. The non-transitory computer-readable medium of claim 1, wherein the more-sensitive frequency band is more greatly impacted by an execution of the second swapping technique than the less-sensitive frequency band is impacted by an execution of the first swapping technique.

3. The non-transitory computer-readable medium of claim 1, wherein the more-sensitive frequency band includes frequencies that are lower than the frequencies in the less-sensitive frequency band.

4. The non-transitory computer-readable medium of claim 3, wherein the more-sensitive frequency band is the L-band in an optical spectrum and the less-sensitive frequency band is the C-band in the optical spectrum, and wherein the L-band and C-band are used for communicating data traffic in a C+L optical network.

5. The non-transitory computer-readable medium of claim 1, wherein the first swapping technique is faster than the second swapping technique.

6. The non-transitory computer-readable medium of claim 1, wherein the first swapping technique, when executed, further causes one or more processing devices to divide the first group of channels or first portion of spectrum into a first number of bundles, wherein the second swapping technique, when executed, further causes the one or more processing device to divide the second group of channels or second portion of spectrum into a second number of bundles, wherein the second number of bundles is greater than the first number of bundles, and wherein each bundle of the first number of bundles includes a larger number of channels or larger portion of spectrum than the number of channels or portion of spectrum in each bundle of the second number of bundles.

7. The non-transitory computer-readable medium of claim 1, wherein the instructions, when executed, further cause the one or more processing devices to
execute the first and second swapping techniques to enact a capacity change by adding or deleting traffic channels, for channel restoration, and/or for recovery from a fault condition.

8. The non-transitory computer-readable medium of claim 1, wherein the first and second groups of channels or first and second portions of spectrum include any combination of data traffic and Amplified Spontaneous Emission (ASE) based channel holders and the first and second sets of replacement channels or first and second portions of replacement spectrum also include any combination of data traffic and ASE-based channel holders.

9. The non-transitory computer-readable medium of claim 1, wherein the instructions, when executed, further cause the one or more processing devices to
analyze the impact of Stimulated Raman Scattering (SRS) over a fiber span.

10. The non-transitory computer-readable medium of claim 9, wherein the instructions, when executed, further cause the one or more processing devices to
reduce a total launch power to the fiber span to reduce the impact of SRS and to enable the first and second swapping techniques to be executed regardless of fiber type.

11. The non-transitory computer-readable medium of claim 10, wherein the presence of a Raman amplifier in the optical link changes an SRS transfer, thereby impacting the bundle count compared to an Optical Multiplex Section (OMS) that has no Raman amplifier.

12. The non-transitory computer-readable medium of claim 9, wherein each of the more-sensitive frequency band and less-sensitive frequency band includes a band-specific amplifier for amplifying the optical signals over the fiber span.

13. The non-transitory computer-readable medium of claim 1, wherein the instructions, when executed, further cause the one or more processing devices to
increase the speed of the second swapping technique by reducing the number of bundles when no traffic is present in the more-sensitive frequency band.

14. The non-transitory computer-readable medium of claim 1, wherein the first and second swapping techniques are based at least in part on Signal to Noise Ratio (SNR) margin available for traffic channels in the more-sensitive frequency band, whereby a higher margin relates to a lower bundle count and a lower margin relates to a higher bundle count.

15. The non-transitory computer-readable medium of claim 14, wherein the first and second swapping techniques, when executed, further cause the one or more processing devices to
swap the first and second groups of channels or first and second portions of spectrum with the first and second sets of replacement channels or first and second portions of replacement spectrum by swapping one bundle at a time.

16. The non-transitory computer-readable medium of claim 15, wherein the instructions, when executed, further cause the one or more processing devices to
swap one or more of the channels of the first group of channels or a part of the first portion of spectrum and one or more of the channels of the second group of channels or a part of the second portion of spectrum simultaneously yet independently of each other.

17. A control device comprising a processing device;

a memory device configured to store computer logic having instructions that, when executed, cause the processing device to swap a first group of channels or first portion of spectrum on an optical link in a more-sensitive frequency band with a first set of replacement channels or first portion of replacement spectrum using a first swapping technique, and swap a second group of channels or second portion of spectrum on an optical link in a less-sensitive frequency band with a second set of replacement channels or second portion of replacement spectrum using a second swapping technique that is different from the first swapping technique, wherein the first and second swapping techniques are based at least in part on the number of channels or portion of spectrum that can be swapped at any given time instance on the optical network.

18. The control device of claim 17, wherein the control device is configured at a section multiplexer in an Optical Multiplex Section (OMS).

19. A method comprising the steps of swapping a first group of channels or first portion of spectrum on an optical link in a more-sensitive frequency band with a first set of replacement channels or first portion of replacement spectrum using a first swapping technique, and swapping a second group of channels or second portion of spectrum on an optical link in a less-sensitive frequency band with a second set of replacement channels or second portion of replacement spectrum using a second swapping technique that is different from the first swapping technique, wherein the first and second swapping techniques are based at least in part on the number of channels or portion of spectrum that can be swapped at any given time instance on the optical link.

20. The method of claim 19, wherein the more-sensitive frequency band is more greatly impacted by an execution of the second swapping technique than the less-sensitive frequency band is impacted by an execution of the first swapping technique.

* * * * *